(12) United States Patent
Mayes et al.

(10) Patent No.: US 7,368,505 B2
(45) Date of Patent: May 6, 2008

(54) GRAFT COPOLYMERS

(75) Inventors: Anne M. Mayes, Waltham, MA (US); Jane Y. Park, Redwood City, CA (US); Metin H. Acar, Istanbul (TR); Ariya Akthakul, Edison, NJ (US)

(73) Assignee: Massachusetts Institute of Technology, Cambridge, MA (US)

( * ) Notice: Subject to any disclaimer, the term of this patent is extended or adjusted under 35 U.S.C. 154(b) by 199 days.

(21) Appl. No.: 11/030,576

(22) Filed: Jan. 5, 2005

(65) Prior Publication Data

US 2006/0089461 A1 Apr. 27, 2006

Related U.S. Application Data

(63) Continuation of application No. PCT/US03/20968, filed on Jul. 3, 2003.

(60) Provisional application No. 60/394,222, filed on Jul. 5, 2002.

(51) Int. Cl.
*C08L 71/02* (2006.01)
*C08F 259/00* (2006.01)
*C08J 5/22* (2006.01)

(52) U.S. Cl. .................. 525/118; 525/353; 525/535; 525/536; 521/27; 521/30; 521/33; 521/34; 521/37

(58) Field of Classification Search ............ 525/118, 525/353, 535, 536; 521/27, 30, 33, 34, 37
See application file for complete search history.

(56) References Cited

U.S. PATENT DOCUMENTS

| | | | | |
|---|---|---|---|---|
| 4,244,817 A | * | 1/1981 | Yaginuma | .............. 210/654 |
| 5,076,925 A | * | 12/1991 | Roesink et al. | ........ 210/500.23 |
| 5,171,264 A | | 12/1992 | Merrill | |
| 6,150,459 A | * | 11/2000 | Mayes et al. | .............. 525/54.1 |
| 6,172,180 B1 | | 1/2001 | Hancock et al. | |
| 6,207,749 B1 | | 3/2001 | Mayes et al. | |
| 6,413,621 B1 | | 7/2002 | Mayes et al. | |
| 2002/0147282 A1 | | 10/2002 | Mayes et al. | |
| 2002/0155311 A1 | | 10/2002 | Mayes et al. | |

OTHER PUBLICATIONS

International Search Report in PCT Application No. PCT/US03/20968, Int'l Filing Date, Mar. 7, 2003.
Mika, A.M., "A new class of polyelectrolyte-filled microfiltration membranes with environmentally controlled porosity," Journal of Membrane Science, vol. 108 (1995), pp. 37-56.
Iwata, Hiroo, et al., "Preparation and properties of novel environment-sensitive membranes prepared by graft polymerization onto a porous membrane," Journal of Membrane Science, vol. 38, (1988) pp. 185-199.
Daley, W.H. et al., "Grafting of Vinyl Polymers to Carboxylated Poly(arylene ether sulfone) Utilizing Barton Ester Intermediates and Nitroxide Mediation," Polymer 41 (2000), pp. 5063-5071.

Hancock, L. et al., "Hydrophilic Semipermeable Membranes Fabricated with Poly(ethylene oxide)-polysulfone Block Copolymer," Biomaterials 21 (2000), pp. 725-733.
Hancock, L. et al., "Phase Inversion Membranes with an Organized Surface Structure from Mixtures of Polysulfone-Poly (ethylene oxide) Block Copolymers," Journal of Applied Polymer Science (1977), 66:1353-1358.
Higuchi, A. et al., "Chemically Modified Polysulfone Hollow Fibers with Vinylpyrrolidone Having Improved Blood Compatibility," Biomaterials 23 (2002) pp. 2659-2666.
Kaeselev, B. et al., "Photoinduced Grafting of Ultrafiltration Membranes: Comparison of Poly(ether sulfone) and Poly(sulfone), " Journal of Membrane Science (2001) 194:245-261.
Kim, H. et al., "The Transport Properties of $CO_2$ and $CH_4$ for Chemically Modified Polysulfones," Journal of Applied Polymer Science (2000) 76:391-400.
Kotzelski, J. et al., "Kinetics of Bonded Invertase: Asymmetric Polysulfone Membranes," Journal of Membrane Science (1996) 114:201-214.
Song, Y. et al., "Surface Modification of Polysulfone Membranes by Low-Temperature Plasma-Graft Poly(ethylene glycol) onto Polysulfone Membranes," Journal of Applied Polymer Science (2000) 78:979-985.
Ting, Y. et al., "Preparation of Polysulfone/Poly(ethylene oxide) Block Copolymers," Macromolecules (1996) 29:7619-7621.
Ulbricht, M. et al., "Novel Photochemical Surface Functionalization of Polysulfone Ultrafiltration Membranes for Covalent Immobilization of Biomolecules," Journal of Membrane Science (1996) 120:239-259.
Yoshikawa, M. et al., "Modified Polysulfone Membranes. III. Pervaporation Seperation of Benzene-Cyclohexane Mixtures through Carboxylated Polysulfone Membranes," Journal of Applied Polymer Science (1999) 74:407-412.
Zhu, S. et al., "Synthesis of Aromatic Polyethersulfone-Based Graft Copolyacrylates via ATRP Catalyzed by $FeCl_2$/Isophthalic Acid," Journal of Polymer Science: Part A: Polymer Chemistry (2001) 39:2943-2950.

* cited by examiner

*Primary Examiner*—Randy Gulakowski
*Assistant Examiner*—Olga Asinovsky
(74) *Attorney, Agent, or Firm*—Wolf, Greenfield & Sacks, P.C.

(57) ABSTRACT

This invention relates to methods of making graft copolymers, and articles having such graft copolymers. The methods may provide better control than in radicalization or photoinitiated polymerization techniques. For example, a graft copolymer can be prepared by reacting an alkoxide ion with a polymer. The alkoxide, in turn, can be provided by any suitable technique, for example, by reacting an alcohol with a base. In some embodiments of the invention, the graft copolymers may be a normally hydrophobic polymer, such as a polysulfone, that has been made more hydrophilic due to the attachment of hydrophilic side groups such as polyethylene glycol or polypropylene glycol. The copolymers of the invention have many uses, for example, in films or porous membranes.

19 Claims, 26 Drawing Sheets

(1) R'-OH + base (i.e. NaH) ⟶ R'-O⁻Na⁺ + H₂

(2) R'-O⁻Na⁺ + R''-X (X=Cl,Br,I) ⟶ R''-O-R' + NaX (1) CH₃(OCH₂)ₙOH + NaH ⟶ CH₃(OCH₂)ₙO⁻Na⁺ + H₂

(2) CH₃(OCH₂)ₙO⁻Na⁺ + PSf-CH₂Cl ⟶ CH₃(OCH₂)ₙ-O-PSf + NaCl (1) PSf-CH₂Cl + CH₃(OCH₂)ₙOH ⟶ CH₃(OCH₂)ₙ-O-PSf

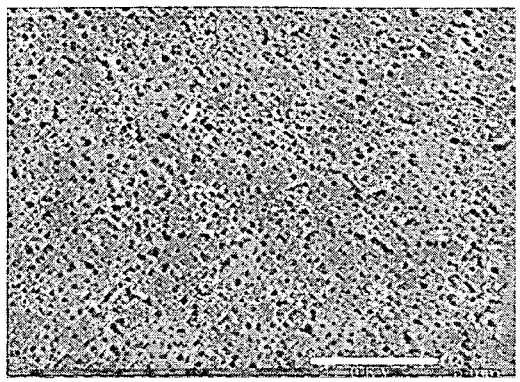
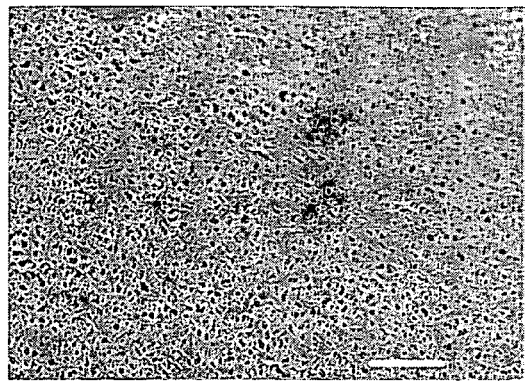
Fig. 17A    Fig. 17B
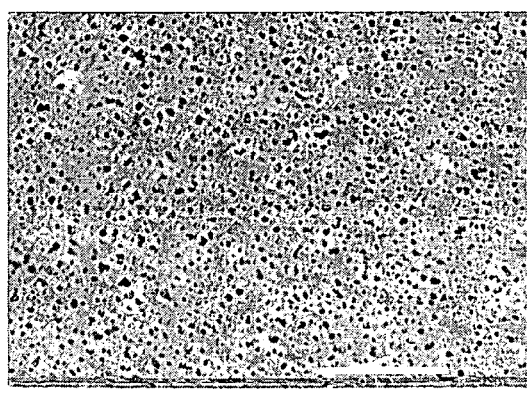
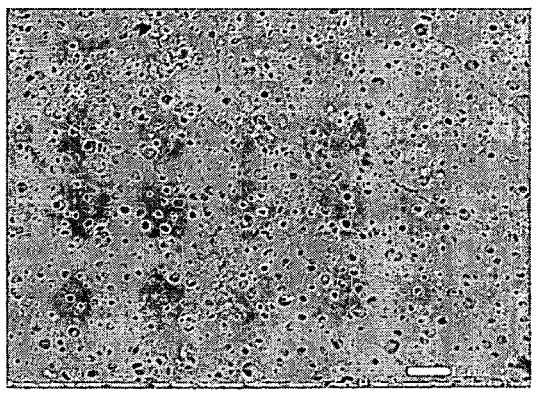
Fig. 17C    Fig. 17D

GRAFT COPOLYMERS

RELATED APPLICATIONS

This application is a continuation of International Application No. PCT/US03/20968 filed Jul. 3, 2003, which was published under PCT Article 21(2) in English, which claims priority to U.S. Application Ser. No. 60/394,222, filed Jul. 5, 2002. Both applications are hereby incorporated by reference.

GOVERNMENT FUNDING

This invention was sponsored by the U.S. Office of Naval Research, Grant No. N00014-99-1-0310. The United States government has certain rights in the invention.

BACKGROUND

1. Field of the Invention

This invention relates to graft copolymers and, in particular, to methods of making graft copolymers such as polysulfone graft copolymers, and articles including such graft copolymers.

2. Description of the Related Art

The ability to control the physical properties of polymers, such as the hydrophilicity, lipophilicity, density, or the molecular weight, is desirable. For example, a polymer that may be desired for a particular application (e.g. a resilient polymer) may not have one or more other physical properties desired, such as wettability; modification of the polymer may achieve the desired properties. For instance, polymers having hydrophilic properties are of great utility, particularly in areas such as resistance to oils and proteins, biocompatibility, resistance to static charge build-up, and wettability to materials such as glues, inks, paints and water. Applications for such polymers include water filtration membranes, biocompatible medical devices and articles. However, most polymers are typically hydrophobic in nature.

One method of producing a hydrophilic polymer is to "coat" a polymer having hydrophobic properties, i.e., covering the polymer with a hydrophilic coating. The coat may be added, for example, by dipping or spraying. However, the coated areas are generally not permanently attached to the underlying polymer support.

Another technique of producing a hydrophilic polymer is to synthesize a polymer having a graft structure. A "graft copolymer" is produced by covalently bonding a species to be grafted (also referred to as a "comonomer"), to a backbone polymer. Graft copolymers may be used to provide a material having specific properties while retaining certain desirable properties of the original backbone polymer.

The production of graft copolymers has previously been achieved using two general techniques: photochemical and chemical. Photochemical techniques include exposure of a polymer to low-temperature plasma, ultraviolet irradiation, or gamma-ray irradiation to begin the polymerization process. Chemical techniques typically use free-radical polymerization or atom transfer radical polymerization to produce the grafted copolymer. For example, Mika, et al., "A New Class of Polyelectrolyte-Filled Microfiltration Membranes with Environmentally Controlled Porosity," *J. Memb. Sci.*, 108, 37-56 (1995) describe UV-induced grafting of 4-vinylpyridine onto polyethylene and polypropylene microfiltration membranes. Iwata, et al., "Preparation and Properties of Novel Environmental-Sensitive Membranes Prepared by Graft Polymerization Onto a Porous Membrane", *J. Memb. Sci.*, 38, 185-199, 1988) report a glow discharge technique to graft polyacrylamide and polyacrylic acid chains onto polyvinylidene fluoride (PVDF) membrane. Hautojarvi, et al, (*J. Memb. Sci.*, 108, 37, 1995) published a similar study of PVDF membranes graft-modified with poly(acrylic acid). However, in many cases, the radicalization process is difficult to control, and unwanted side reactions such as degradation or cross-linking can occur, as well as difficulties in minimizing polydispersity. Also, in many cases a bulk polymer article is produced, and then functional groups are grafted onto polymer chains that define the article. This can result in non-ideal characteristics. Another graft copolymer synthesis technique is described in U.S. patent application Ser. No. 09/951,125, filed Sep. 12, 2001, by Mayes et al.

While the above and other reports include, in many cases, useful graft copolymers, there is a continued need in the art for impoved, more versatile graft polymerization techniques and articles produced by these techniques.

SUMMARY OF THE INVENTION

This invention generally relates to graft copolymers of polysulfones and other polymers where grafting can be used to tailor properties of the polymer, for example to provide hydrophilic properties. The subject matter of this application involves, in some cases, interrelated products, alternative solutions to a particular problem, and/or a plurality of different uses of a single system or article.

In one aspect, the invention comprises a method. In one embodiment, the method includes the steps of reacting an alcohol with a base to produce an intermediate, and reacting the intermediate with a polymer to produce a graft copolymer having at least one polymeric side chain comprising at least 4 repeat units. In another embodiment, the method is defined in part by the step of reacting an alkoxide with a polymer to produce a graft copolymer having at least one polymeric side chain comprising at least 4 repeat units. The method, in yet another embodiment, includes the steps of reacting a first polymer having at least 4 repeat units and at least one hydroxide group with a base to produce an intermediate, and reacting the intermediate with a second polymer to produce a graft copolymer. In still another embodiment, the method includes the step of reacting an alkoxide comprising a polymer with at least 4 repeat units with a polymer to produce a graft copolymer.

The invention, in another aspect, includes an article. In one set of embodiments, the article includes a non-radicalized graft copolymer. In another set of embodiments, the article has a surface and a bulk, where the bulk comprises a graft copolymer. In yet another set of embodiments, the article comprises a film having a graft copolymer. In still another set of embodiments, the article comprises a membrane having a graft copolymer. In one embodiment, the membrane has a porosity such that the flux of a liquid through the membrane is at least about 100 L/m$^2$ h. In another embodiment, the membrane has a porosity of at least about 20%. In some of these embodiments, the graft copolymer is a polyalkylene glycol-polysulfone graft copolymer. In certain embodiments, the graft copolymer is hydrophilic. In some embodiments, the graft copolymer has at least one polymeric side chain with at least 4 repeat units. In certain embodiments, a ratio of the number average molecule weight of the polymer side chains of the graft copolymer to the weight average molecular weight of those side chains is less than 2.

In yet another aspect, the invention is directed to a method of using any of the embodiments described herein.

Other advantages, novel features, and objects of the invention will become apparent from the following detailed description of non-limiting embodiments of the invention when considered in conjunction with the accompanying drawings, which are schematic and which are not intended to be drawn to scale. In the figures, each identical or nearly identical component that is illustrated in various figures typically is represented by a single numeral. For purposes of clarity, not every component is labeled in every figure, nor is every component of each embodiment of the invention shown where illustration is not necessary to allow those of ordinary skill in the art to understand the invention. In cases where the present specification and a document incorporated by reference include conflicting disclosure, the present specification shall control.

BRIEF DESCRIPTION OF THE DRAWINGS

Non-limiting embodiments of the present invention will be described by way of example with reference to the accompanying drawings in which:

FIGS. 17A-17D show a series of SEM images of various porous polysulfone membranes;

DETAILED DESCRIPTION

Figures 1, 2A, 2B:
FIG. 1 shows a general reaction pathway of known Williamson ether synthesis.
FIGS. 2A-2B illustrate synthesis of a polysulfone ("PSf"), using strong base or weak base chemistry in accordance with the invention.

U.S. patent application Ser. No. 09/951,125, filed Sep. 12, 2001, by Mayes et al., International Pat. Apl. Ser. No. WO 02/22712, published Mar. 21, 2002, by Mayes, et al., and International Pat. Apl. Ser. No. WO 98/08595, published Mar. 5, 1998, by Mayes, et al., are incorporated herein by reference.

This invention relates to methods of making graft copolymers, and articles having such graft copolymers. The methods may provide better control than in radicalization or photoinitiated polymerization techniques. For example, a graft copolymer can be prepared by reacting an alkoxide ion with a polymer. The alkoxide, in turn, can be provided by any suitable technique, for example, by reacting an alcohol with a base. In some embodiments of the invention, the graft copolymers may be a normally hydrophobic polymer, such as a polysulfone, that has been made more hydrophilic due to the attachment of hydrophilic side groups such as polyethylene glycol or polypropylene glycol. The copolymers of the invention have many uses, for example, in films or porous membranes.

As used herein, "polymer" is given its ordinary meaning in the art. A polymer is composed of one or more "repeat units," which are bonded together in some fashion. In one embodiment, the polymer has at least 2 repeat units. In other embodiments, the polymer may have at least 4 repeat units, at least 7 repeat units, at least 12 repeat units, at least 17 repeat units, at least 44 repeat units, or at least 100 repeat units. Furthermore, there may be more than one type of repeat unit within a polymer, in which case the polymer is termed a "copolymer."

In one set of embodiments, the polymer is a "graft" copolymer. In a graft copolymer, one or more side chain polymers are connected to a main chain or "backbone" polymer. In one embodiment, the graft copolymer comprises the same backbone as the original, or parent, polymer. The graft copolymer differs from the parent polymer in that the graft copolymer has a plurality of side chains extending from the backbone at sites at which the side chains are linked to the backbone via reaction. If the reactive sites were present in the parent at substantially regular intervals, the resulting graft copolymer can include side chains spaced at substantially regular intervals. Such graft copolymers resemble a comb and are typically termed "comb polymers." In one embodiment, the graft copolymer is amphiphilic, i.e., one portion of the copolymer is hydrophobic, while another portion is hydrophilic; for example, the copolymer may have hydrophilic (polar) side chains and a hydrophobic (nonpolar) backbone.

The backbone polymer may be any organic polymer. The "backbone" typically refers to the longest continuous bond pathway of a polymer. In some embodiments, the backbone polymer may be hydrophobic, and may be biodegradable or hydrolyzable under certain conditions. Examples of backbone polymers include polyamino acids, polyanhydrides, polyorthoesters, polyphosphoesters, polylactones, polyhydroxy acids, polyalkylenes, polychloroprene, polyvinyl ethers, polyvinyl esters, polyvinyl halides, polyacrylates, and derivatives or copolymers thereof. The polymers may also include various substitutions, additions of functional groups, hydroxylations, oxidations, reductions, or other modifications routinely made by those skilled in the art.

In one set of embodiments, the backbone chain comprises a polysulfone. The polysulfones are a class of thermoplastics that are desirable for many applications due to their toughness and mechanical strength, as well as their high glass transition temperature, thermostability and chemical inertness. These properties allow polysulfone materials to be processed at temperatures of between 150 and 200° C. without requiring special conditions.

As used herein, a "polysulfone" generally is a polymer having a sulfone linkage (i.e., an —SO$_2$-moiety between two atoms) within a repeat unit of the polymer, preferably within the backbone of the polymer. The polysulfone, in certain embodiments, may also have other linkages within the backbone, for example, an ether linkage (—O—), or a diyl linkage such as an alkyldiyl linkage, for example, an isopropylidine linkage (—C(CH$_3$)$_2$—) or a methylidine linkage (—CH$_2$—). The linkages may be in any order, for example, in a regular fashion or distributed randomly. Other organic groups may also be found within the polymer backbone, for example, double bonds or aromatic groups such as benzene rings, In one embodiment, a polysulfone may have a molecular formula:

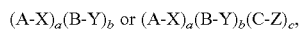

where X comprises a sulfone linkage, Y comprises an ether linkage, and Z comprises a diyl linkage, for example. A, B, and C represent organic groups forming the backbone chain and a, b, and c are each greater than zero. For example, A, B, and/or C may include alkyl chains, benzene rings, double or triple bonded carbon atoms, functional groups, halogens, hydroxides, nitrogen or oxygen atoms, and the like, as well as modifications routinely made by those of ordinary skill in the art. Examples of polysulfones include:

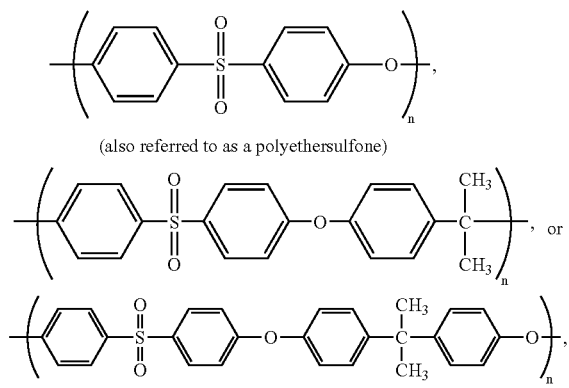

(also referred to as a polyethersulfone)

where n indicates the number of repeat units in the molecule.

The side chains may be any composition that can be grafted onto the polymer backbone, and are generally selected to affect a property of the resultant graft copolymer, such as its hydrophilicity or hydrophobicity. In some embodiments, the side chain may be a polymer, and the composition of the polymer may be the same or different than the backbone polymer. The side chains may comprise any number of monomeric units having any molecular weight, for example, between 1 and 100 repeat units. In one embodiment, the side chain comprises at least 4 repeat units. In other embodiments, the side chain may comprise at least 7 repeat units, at least 12 repeat units, at least 17 repeat units, at least 44 repeat units, or at least 100 repeat units.

It is a feature of the invention that the side chains can be are controllably prepared and grafted onto the polymer backbone, thus in one set of embodiments the resulting graft copolymer does not have a wide dispersity in the length of the side chains. For example, the "polydispersity" of the side chains, or the number average molecule weight of the polymer side chains to their weight average molecular weight (i.e., without including the backbone of the copolymer) may be less than 3, preferably less than 2.5, more preferably less than 2, and still more preferably less than 1.5.

In some embodiments, the side chains may be hydrophilic and water-soluble, and, in some cases, may be non-ionic. In certain embodiments, the side chains may be biodegradable or hydrolyzable. Examples of side chains include, for example, polyethylene oxide, partially or fully hydrolyzed polyvinyl alcohol, polyvinylpyrrolidone, dextran, polyacrylic acids, and derivatives or copolymers thereof. The polymers may also include various substitutions, additions of functional groups, hydroxylations, oxidations, reductions, or other modifications routinely made by those skilled in the art. In one set of embodiments, the side chains comprise a polyalkylene glycol, such as, for example, polyethylene glycol or polypropylene glycol.

As used herein, the terms "hydrophilicity" and "hydrophobicity," as well as related terms, are given their usual definitions as is understood by those of ordinary skill in the art. A hydrophilic substance generally is a polar substance that is attracted to an aqueous environment, and a hydrophobic substance generally is a nonpolar substance that is attracted to a lipophilic environment. Those of ordinary skill in the art will understand that the degree of hydrophilicity of a substance can be measured and expressed in different ways; examples include the partition coefficient, the contact angle, or the water permeability.

One example technique of determining the degree of hydrophilicity of a substance is to measure the partitioning or distribution of the substance in a biphasic system having an aqueous phase and an organic phase, such as, for example, water and 1-octanol. Another technique is to measure the degree of retention of the substance in a reversed-phase high performance liquid chromatography column or a thin-layer chromatography column. In another technique, a contact angle measurement technique may be used. For example, a hydrophilic substance may form an advancing contact angle of less than about 80°, preferably less than about 75°, more preferably less than about 70°, still more preferably less than about 65°, and still more preferably less than about 55° or 60°. In other techniques, the permeability or the diffusion coefficient of the substance in water may be used. For example, the permeability coefficient of a hydrophobic substance may be about $3 \times 10^{-10}$ cm$^3_{STP}$ cm/cm$^2$s Pa, where cm$^3_{STP}$ refers to a volumetric measurement made at standard temperature (25° C.) and pressure (1 atm). In another technique, the "wettability" of the substance may be determined. The wettability may be measured by subjecting a 200 micron thick article to water, and measuring the time for complete wettability to occur (i.e., >99% absorption of water). For example, the time for complete wettability may be less than about 15 min or less than about 5 min. The appropriate test to be used for determining the degree of hydrophilicity can be determined by those of ordinary skill in the art.

One aspect of the present invention provides a method for synthesizing grafted copolymers. "Grafting" generally involves a providing parent polymer having reactive sites in some or all of the repeat units, and adding a species to be grafted (also known as a comonomer) to the parent polymer at the reactive sites.

In some cases, the grafted copolymer is a non-radicalized copolymer. As used herein, "non-radicalized" refers to a copolymer made in the absence of radicalization reactions (such as free-radical or atom transfer radical polymerization techniques) or photochemical reactions that can generate radicals (e.g., exposure to low-temperature plasma, ultraviolet irradiation, or gamma irradiation). In some embodiments, the use of non-radicalized polymerization techniques allows better control over the polymerization process. Thus, in these embodiments, the polydispersity may be minimized, for example, to less than 3, preferably less than 2.5, more preferably less than 2, and still more preferably less than 1.5. As used herein "polydispersity," or the "polydispersity index" is given its ordinary meaning, i.e., the ratio of the number average molecular weight to the weight average molecular weight. In other embodiments, the use of non-radicalized techniques allows the "polydispersity" of the side chains to be minimized, for example, to less than about 2. In still other embodiments, the use of non-radicalized polymerization techniques allows better control of the porosity or structure of articles made from the copolymer. For example, the distribution of pore sizes within the article may be such that 80%, 90%, or 95% of the pores have a pore diameter that is within 20%, 10%, or 5% of the mean pore diameter. As another example, more uniform pore sizes may offer better separation characteristics than can be achieved using other techniques.

In one embodiment, the grafted copolymer ("RO-polymer" as discussed below) may be prepared by reacting an alkoxide ion (RO$^-$) with a halogenated polymer ("polymer-X" in Equation 2). ("R," of course, may be any organic group, for example, an alkyl group, an aryl group, or a polymer.) The alkoxide ion can optionally be prepared by any suitable technique, for example, the reaction of an alcohol (ROH) with a base ("base-H" in Equation 1), such that RO$^-$ acts as an intermediate:

ROH+base-H→RO$^-$+H$_2$ (1)

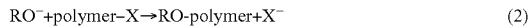
RO$^-$+polymer-X→RO-polymer+X$^-$ (2)

These reactions are based in part on the well-known Williamson ether synthesis technique (illustrated in FIG. 1). By varying the reaction conditions and the reaction time, graft copolymers having side chains of specific lengths can controllably be formed using these reactions. Examples of these reactions are illustrated in FIGS. 2A-2B.

As used herein, an "alcohol" is given its ordinary definition as is understood in the field of organic chemistry. An alcohol is an organic compound that contains a hydroxide group (OH). The alcohol may be, for example, aliphatic or aromatic. The alcohol may also contain any number of carbon atoms, hydrogen atoms, oxygen atoms, etc., and also may contain other functional groups, for example, additional hydroxide groups, halogenated groups, and the like.

In some embodiments, the alcohol may be a glycol. As used herein, a "diol" is an alcohol that contains at least two hydroxide groups, and a "glycol" is an alcohol that contains at least two hydroxide groups bonded to adjacent carbon atoms, or a polymer comprising such alcohols (e.g., polyethylene glycol). For example, the glycol may be an alkylene glycol such as ethylene glycol or propylene glycol. The glycol may also be a polyalkylene glycol, for example, polypropylene glycol or polyethylene glycol. The polyalkylene glycol may have any number of subunits (for example, between 1 and 50), and the subunits may be the same or different (for example, poly(ethylene glycol-co-propylene glycol)). The glycol may have any molecular weight, for example, a molecular weight of 350 Da, 550 Da, 750 Da, or 2000 Da (a "dalton" (Da) is an alternate name for the unified atomic mass unit, or g/mol). Additionally, the glycol may be a straight chain polymer, or be branched in some fashion.

The base may be any base that is able to react with the alcohol to produce an alkoxide reaction. The base may be, for example, a Lewis base, and may the base may preferably have a hydrogen atom able to react with the hydroxide group. The base may be, for example, a strong base, such as an inorganic base or a metallic base (e.g., NaH or KOH). Alternatively, the base may be a weak base, such as an organic base (e.g., pyridine or ethylamine).

The halogenated polymer may be any halogenated polymer, such as those described above. For example, the polymer may be a chlorinated or a brominated polysulfone. In some embodiments, more than one type of halogen atom may be present within the polymer, for example, the polymer may contain both bromine and fluorine moieties. The halogenated sites within the polymer may be chosen in any fashion, for example randomly, or spaced in a certain way to promote the formation of a regular arrangement of side chains on the final polymer molecule, such as in a comb polymer structure.

Graft copolymers of the invention can be used in a variety of ways. For example, they can be formed as an article, for example a block (from which to make other articles), a medical device, a series of particles, a membrane, a thin film, etc. They may be used by themselves, or may be combined with other materials (e.g. as a blend). For example, additional polymers or copolymers, such as polyacrylates or polyvinylidene fluorides, may also be combined with graft copolymers of the invention (for example, as in a blend as mentioned above, or chemically bonded to the graft copolymer). An additional polymer may be introduced for various reasons, such as to impart additional mechanical stability, hydrophilicity, or chemical inertness to the article.

In one embodiment, a graft copolymer of the invention (or a combination of two or more) can be combined with another polymer in an entangled arrangement. As used herein, the term "entangled" means that portions of polymer chains of separate, non-crystalline components wrap about each other, creating physical barriers to motion. The term is well-known to those of ordinary skill in the art. Generally, this means that the added polymer (the polymer or polymers combined with one or more graft copolymers of the invention) should have a molecular weight of at least about 5000 Da, preferably at least about 10 kDa, more preferably at least about 15 kDa, and more preferably still at least about 20 kDa. Entangled polymers have been described in, for example, "Polymer Articles, Including Membranes, Having Hydrophilic Surfaces and Method for Their Preparation" by Mayes et al., Int. Pat. Publ. WO 98/08595, published Mar. 5, 1998, referenced above.

In one set of embodiments, an article of the invention is formed as an amorphous solid having a glass transition temperature of greater than about 150° C., preferably greater than about 170° C., more preferably greater than about 180° C., and still more preferably greater than about 190° C. or 200° C. Relatively high glass transition temperatures allows certain advantages, including stability in environments of use where high temperatures are the norm.

In some embodiments of the invention, the formed article may be thick enough such that the surface and the interior or "bulk" of the article have measurably different compositions or physical properties. For example, the bulk of the article may be depleted or enriched in graft copolymer relative to the surface concentration. The "bulk" of the article may be defined to be at a depth such that molecules at that location do not significantly interact with and are not affected by the external environment. In one embodiment, the "bulk" of the article may be at a depth of at least 1 micron relative to the surface. In other embodiments, the bulk may be at least 100 nm, 10 nm or 1 nm away from the surface.

In certain embodiments, articles of the invention may exhibit resistance to cell attachment. As used herein, "resistance to cell attachment" refers to articles that exhibit no observable cell attachment after standard cell culturing assays in serum-containing media for 24 hours. In other embodiments, articles of the invention may exhibit interactions with cells, for example, in embodiments where cell-attachment molecules are bonded to the copolymer.

In some embodiments, the copolymers of the invention may also be combined or blended with other polymers or copolymers that can regulate cell-surface interactions, for example, as described in U.S. Pat. No. 6,150,459 by Mayes, et al.; U.S. Pat. No. 6,207,749 by Mayes, et al.; or U.S. Pat. No. 6,399,700 by Mayes, et al., all of which are incorporated herein by reference.

The articles of the invention may also reduce the absorption of proteins (e.g., bovine serum albumin, "BSA") thereto in certain embodiments. For example, the amount of absorbed proteins may be decreased by greater than about 50%, preferably greater than about 60%, more preferably greater than about 70%, and still more preferably greater than about 80% or 90% in some instances, relative to an unmodified polysulfone film.

The article may be a mechanically stable structure in certain embodiments of the invention. For instance, the mechanical stability may be measured by subjecting a 200 micron (0.008 inch) thick sample of the copolymer to a pressure of 6.8 atm (100 psi) without collapse. In some cases, the copolymer will be able to resist greater pressures without collapse, for instance, pressures of at least 15 atm, 30 atm, 50 atm, or 70 atm without collapse.

In one set of embodiments, the graft copolymer is formed as a porous structure, for example, a porous film or a porous membrane. In one embodiment, the porosity of the structure may be such that the flux of a liquid (such as an aqueous liquid) through the structure is at least about 100 $L/m^2$ h, more preferably at least about 150 $L/m^2$ h or 200 $L/m^2$ h. In another embodiment, the porosity may be measured in terms of relative volume. The porosity of a porous structure of the invention may be, for example, about 20%, 30%, 40%, or 50% in some cases. In one embodiment, the surface of the article has a spinodal morphology.

Another aspect of the present invention is a technique involving subjecting a copolymer of the invention to phase inversion or phase separation. The phase inversion technique can be driven completely by enthalpy, or by entropy, or a combination. In one embodiment the copolymer is first provided as a polymeric fluid, typically including the copolymer dissolved in a solvent such as dimethyl formamide (DMF), and then the polymeric fluid is exposed to a second, incompatible fluid (nonsolvent; such as water) to form an emulsion. The second, incompatible fluid forms a porous structure in the polymeric fluid, and from the emulsion is recovered a porous article. Any of a variety of articles, including membranes, can be fabricated in this manner. In one set of embodiments, control of the surface chemistry of a polymer can be achieved by designing a surface-modifying polymer component that will be entropically-driven to the surface of the article because of its branched molecular architecture, providing the surface-modifying component with a chemical functionality desired at the surface, and designing the component so that it will be compatible with the base component of the polymer matrix. As used herein, "entropically-driven" is meant to define driven by a force enhanced at least in part by entropy. That is, the surface-modifying polymer component is driven to the surface essentially exclusively by entropic forces, or by a combination of forces at least one of which is entropic.

According to the above and other techniques, some of which are described in the above-referenced international patent publication nos. WO 02/22712 and WO 98/08595, the invention also provides an article including a graft copolymer as described herein, in combination with a second polymer, where the ratio of the graft copolymer and the second polymer at the surface of the article differs from the ratio between the two in the bulk of the article. For example, the article can be defined by an entangled blend these two polymers, where they are selected to be compatible with each other at room temperature, and where the graft copolymer is present at the surface of the article in a ratio to the second polymer that is greater than the ratio between the two in the bulk of the article. The graft copolymer may be more hydrophilic than the second polymer in this arrangement. One or both of the above-referenced international patent publication nos. WO 02/22712 and WO 98/08595 describe specific details that can apply here, such as rations and characteristics as a function of distance into the article from the surface of the article, etc.

In accordance with the invention, membranes or films can be formed having very small pores, thus reverse osmosis membranes, ultrafiltration membranes, and the like can be made. The invention includes membranes, which can be formed according to methods of the invention, having pores smaller than 10 microns in diameter, more commonly smaller than 1 micron in diameter, more commonly smaller than 0.5 microns in diameter, and can include membranes having pores on the order of 0.1 micron diameter average pore size. Membranes can be formed having pores of even smaller size, for example as small as 1 nm. These values can define maximum pore sizes of membranes of the invention, average pore sizes of membranes of the invention, or a combination. That is, in one embodiment the invention includes a membrane having average pore size of less than 0.1 micron and maximum pore size of less than 0.2 micron, etc. Various combinations are possible.

In one set of embodiments, the addition of glycerol to the copolymer may be used to create a porous structure, for example, within the polymeric fluid as previously described. Glycerol may be added at any suitable concentration, depending on the desired porosity; for example, a solution of 2 wt %, 4 wt %, 6 wt %, 8 wt %, 10 wt %, 15 wt %, or 20 wt % or more may be used.

If the article is a film or a membrane, it may be produced by any suitable technique, for example, spin-casting, dip coating, brush coating, roll coating, spraying, or casting the copolymer onto a surface. Alternatively, particles comprising the graft copolymer may be heat-treating to a temperature above the glass transition temperature allowing the particles to coalesce into a film. Solid form processes such as three-dimensional printing or lyophilization techniques could also be used to create three-dimensional structures, including porous structures. In all of these processing approaches a suitable cross-linking agent might be incorporated to enhance the mechanical rigidity of the coating or device.

The function and advantage of these and other embodiments of the present invention will be more fully understood from the examples below. The following examples are intended to illustrate the benefits of the present invention, but do not exemplify the full scope of the invention.

EXAMPLE 1

In this example, the graft copolymerization of a hydrophilic group, polyethylene glycol monomethyl ether ("PEG-OH"), onto a polysulfone backbone was demonstrated. PEG-OH was chosen as the hydrophilic group in this example because of its protein-resistant and fire-resistant properties, as well as its biocompatiblity.

Initially, four samples of 0.017 mol of PEG-OH with respective molecular weights of approximately 350 Da, 550 Da, 750 Da and 2000 Da were each dissolved in 20 ml of anhydrous 1-methyl-2-pyrrolidinone ("NMP"). Next, 0.034 mol of pyridine were added dropwise to each PEG-OH/NMP solution while stirring. After allowing the reaction to occur for about 15 min, 0.034 mol of a chlorinated polysulfone, dissolved in 40 ml of anhydrous NMP, were added dropwise to each reaction mixture. The reaction was performed at room temperature (about 25° C.) under ambient air for 24 h to 48 h, with the exact reaction time being determined from the desired amount of PEG grafting.

Figure 3A:
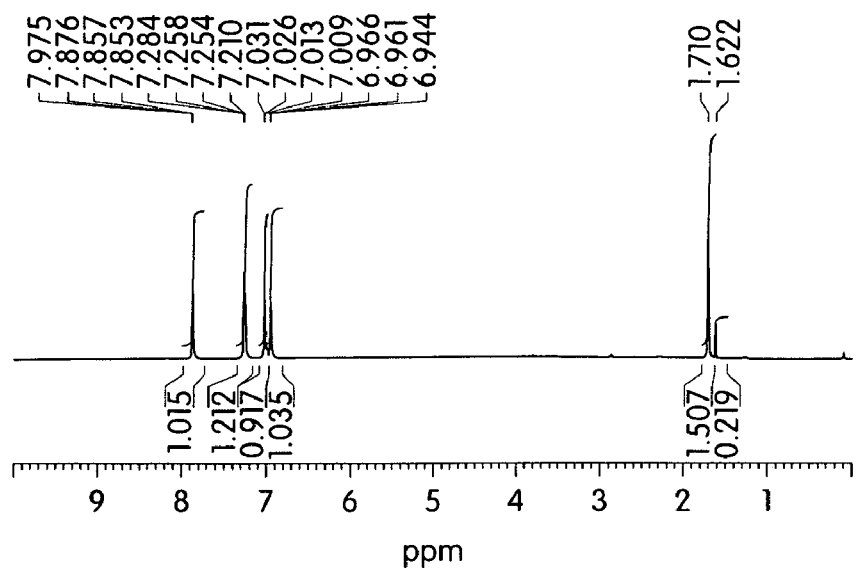
FIGS. 3A-3B illustrate $^1$H NMR spectra for a polysulfone and a chlorinated polysulfone.
Figure 3B:
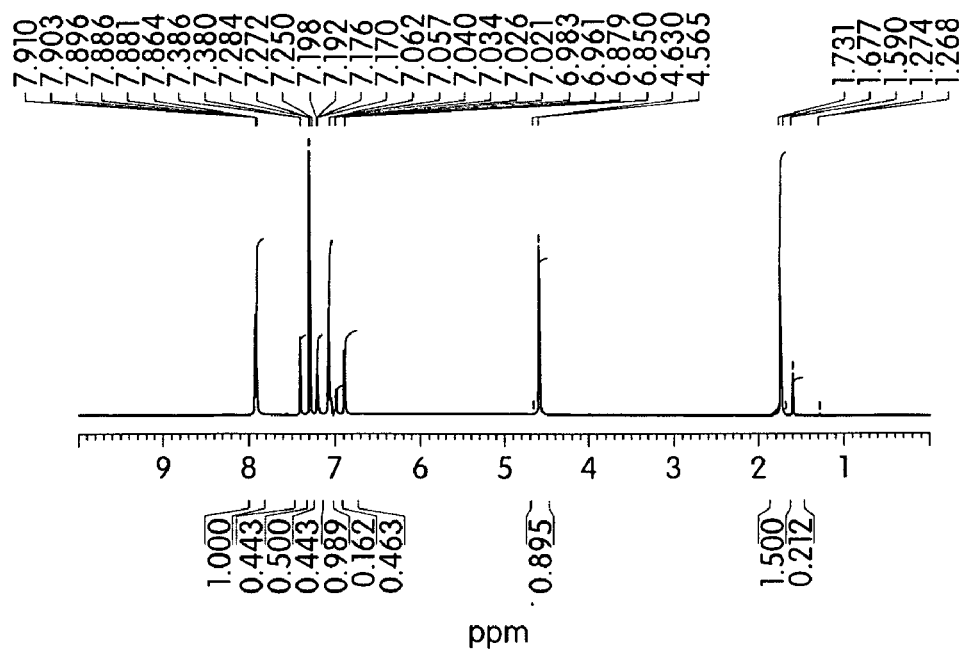
Figure 4A:
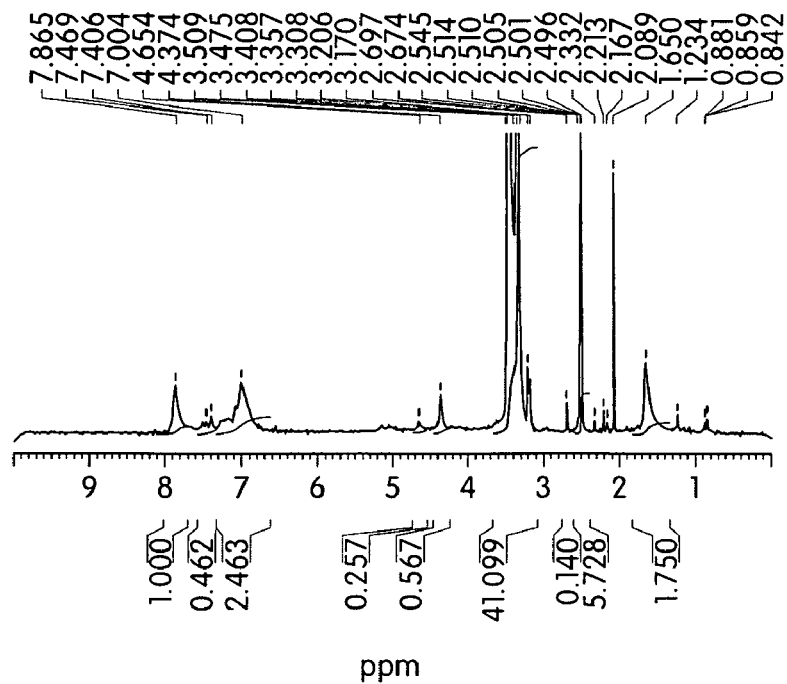
FIGS. 4A-4C illustrate $^1$H NMR spectra for graft copolymers of polysulfone and polyethylene glycol.
Figure 4B:
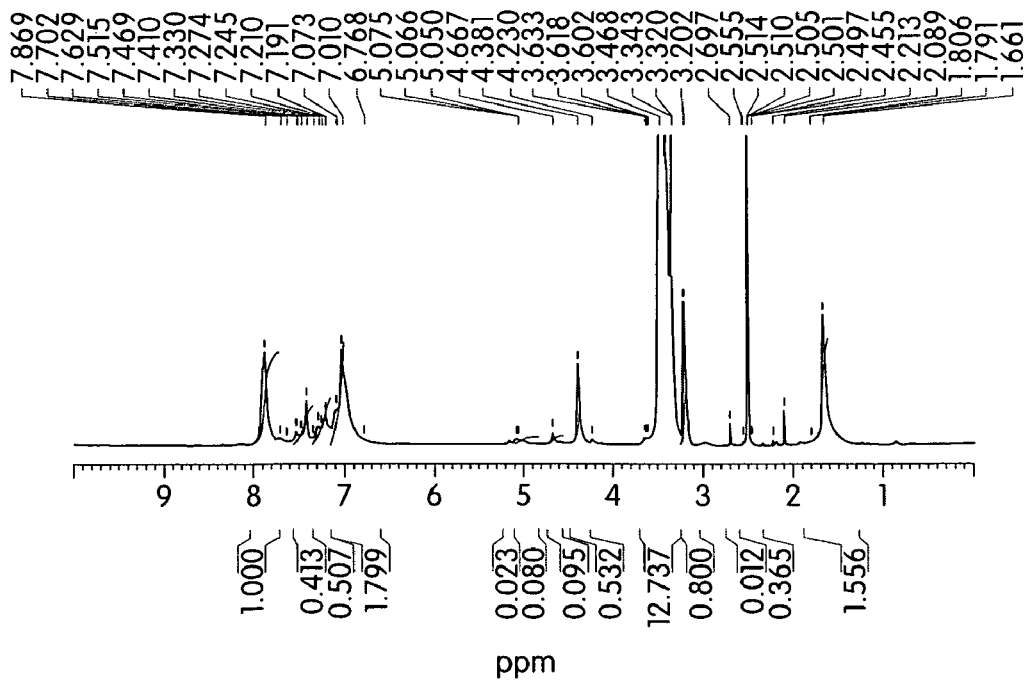
Figure 4C:
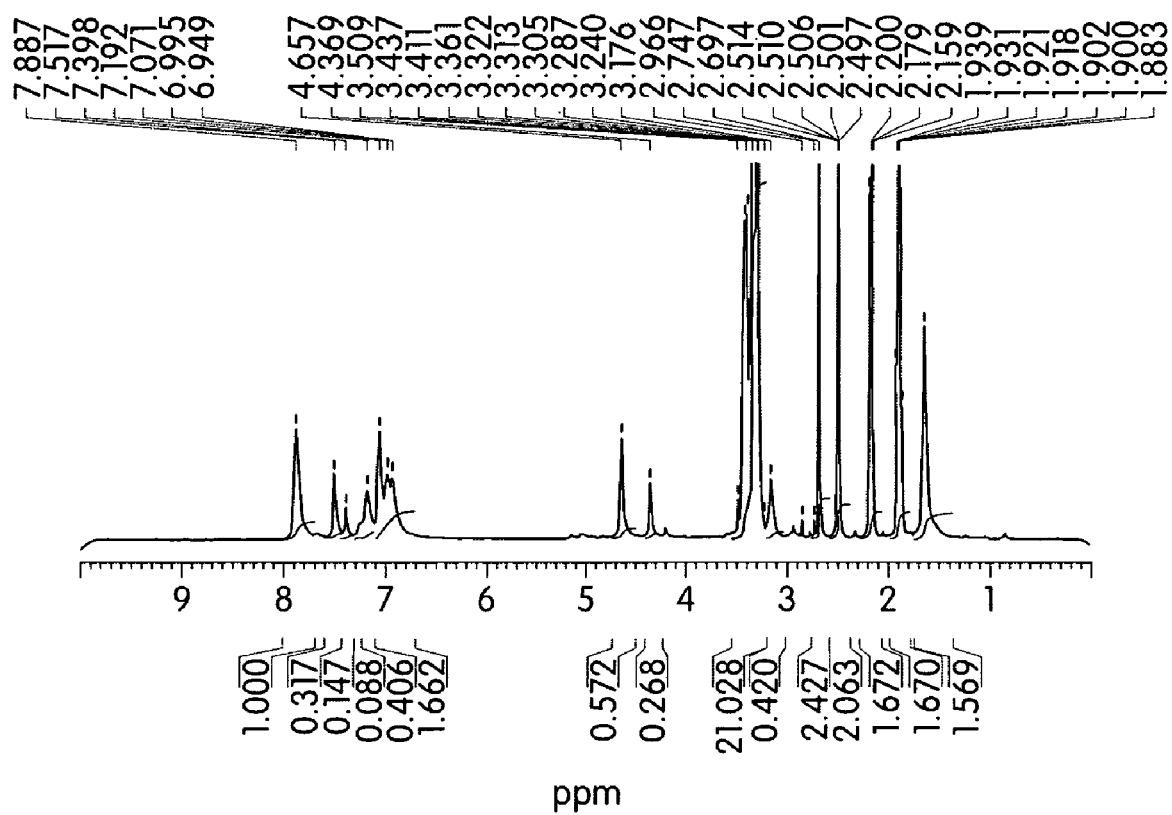
Figure 5A:
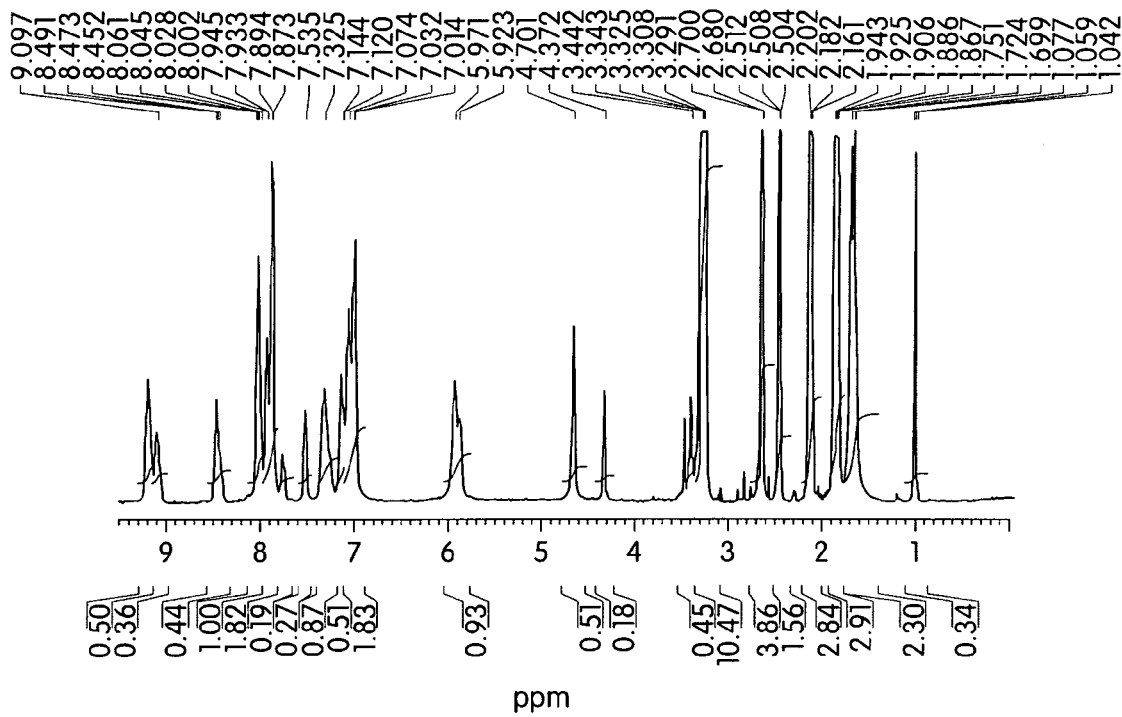
FIGS. 5A-5D illustrate additional $^1$H NMR spectra for graft copolymers of polysulfone and polyethylene glycol.
Figure 5B:
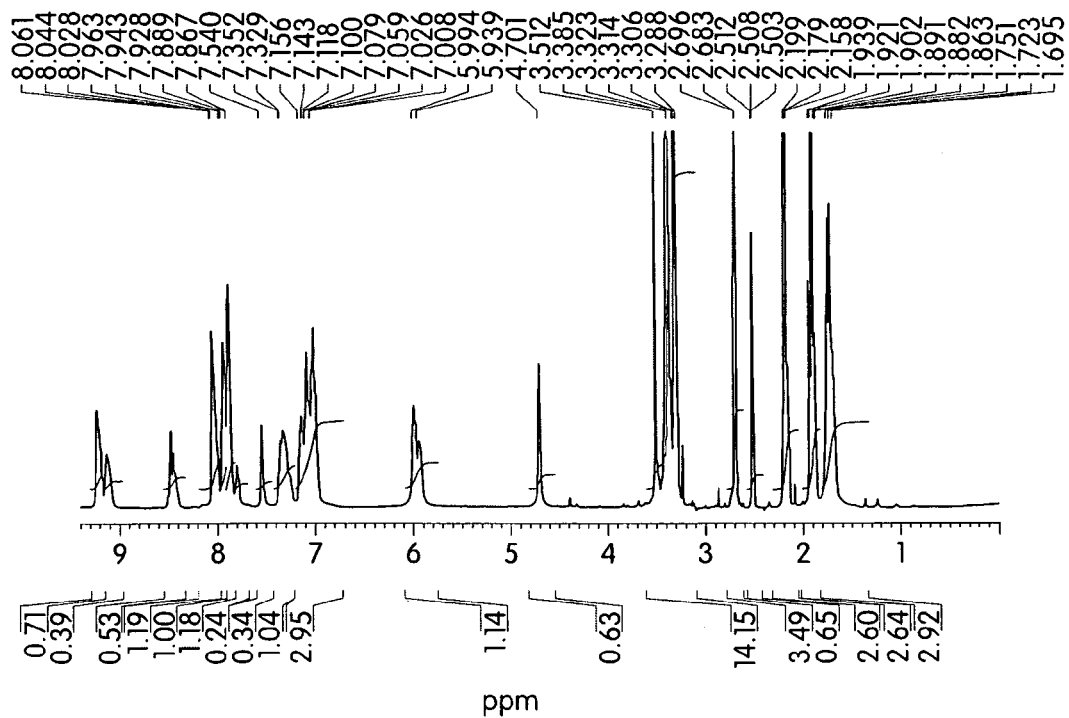
Figure 5C:
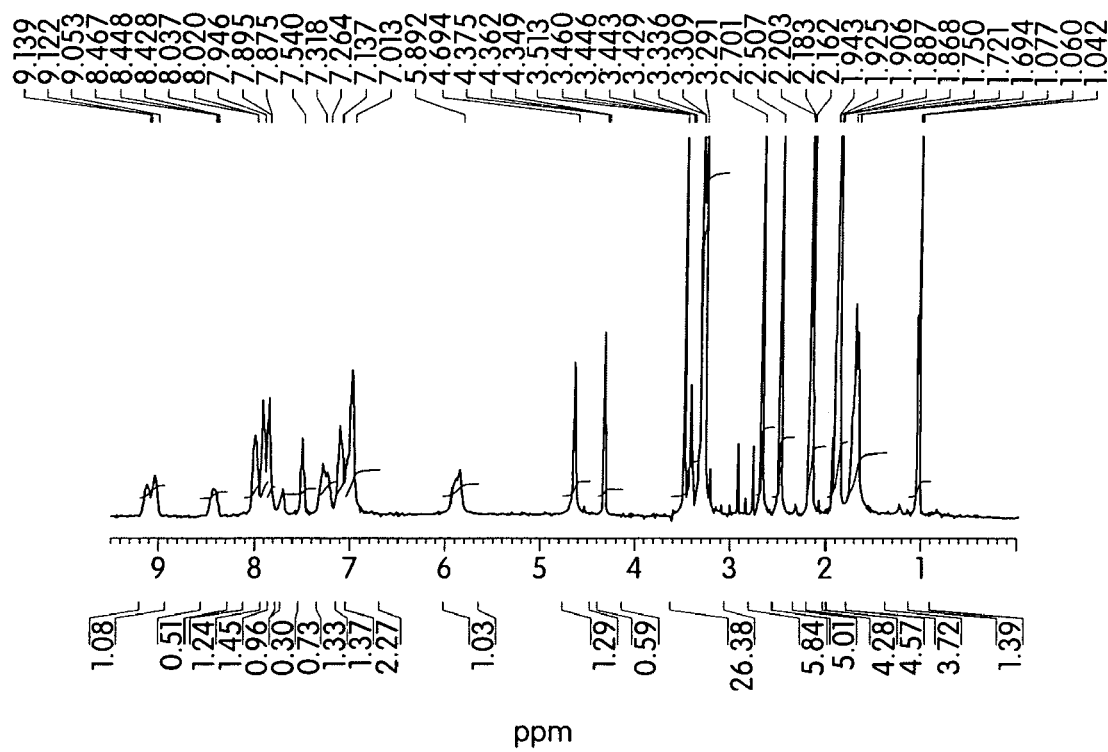
Figure 5D:
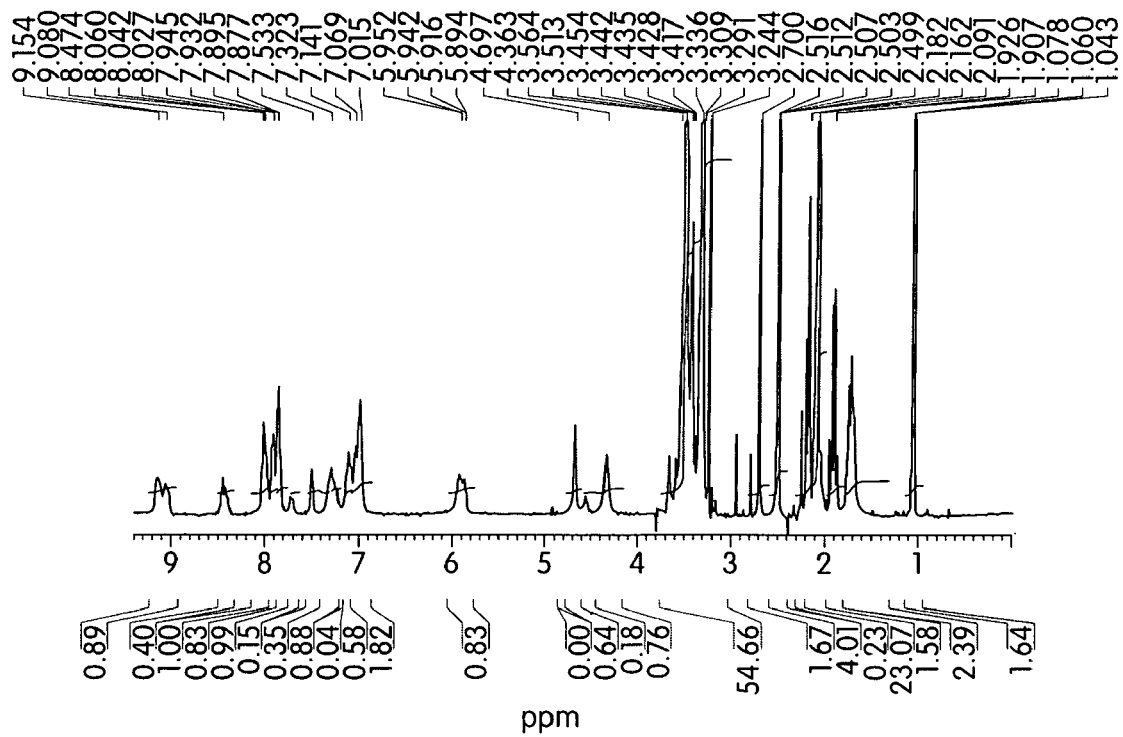

$^1$H nuclear magnetic resonance ("NMR") techniques were used to determine the amount of PEG grafted onto the polysulfone. $^1$H-NMR is a well-known analytical technique. Grafted PEG-OH having a molecular weight of about 350 Da (i.e., a PEG chain having n=7 repeat units of —$CH_2$—$CH_2$—O—) showed 30 wt % of PEG grafted onto polysulfone when the reaction time was 24 h. When the reaction time was 48 h, 38 wt % of PEG had been grafted onto polysulfone. Additionally, it was found that PEG-OH monomer having molecular weights of 550 Da (n=12), 750 Da (n=17), and 2000 Da (n=44) were successfully grafted to chlorinated polysulfone, using techniques similar to those described here. $^1$H-NMR spectra for the grafted polysulfones synthesized in this example are illustrated in FIG. 5 for the ethylene glycols of 350 Da (FIG. 5A), 550 Da (FIG. 5B), 750 Da (FIG. 5C), and 2000 Da (FIG. 5D). For comparison, $^1$H-NMR spectra of an unmodified polysulfone (FIG. 3A) and a chlorinated polysulfone (FIG. 3B) are illustrated in FIG. 3, and 1H-NMR spectra of grafted polysulfones using NaH instead of pyridine are shown in FIG. 4 for ethylene glycols of 750 Da (FIG. 4A), 550 Da (FIG. 4B), and 350 Da (FIG. 4C).

Figure 6A:
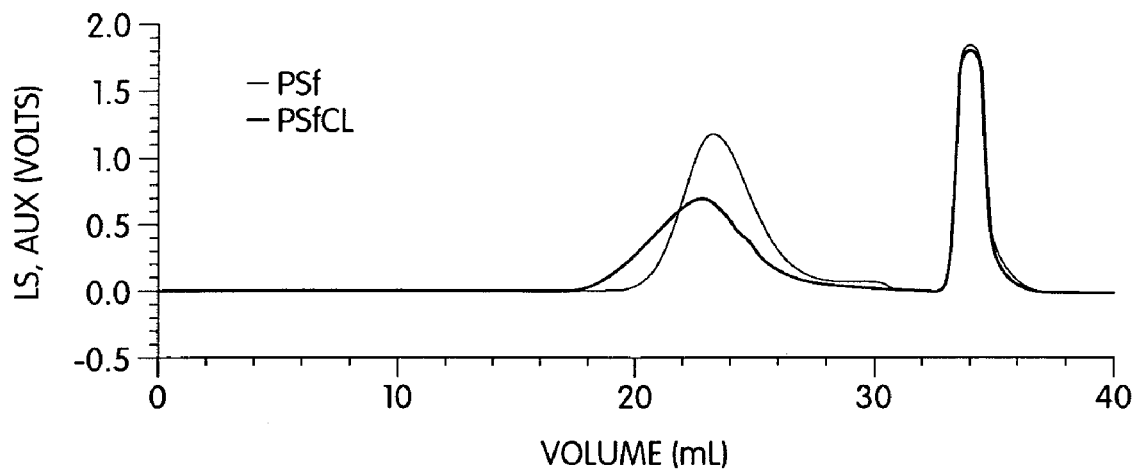
FIGS. 6A-6D illustrate gel permeation chromatography ("GPC") traces for various polysulfones.
Figure 6B:
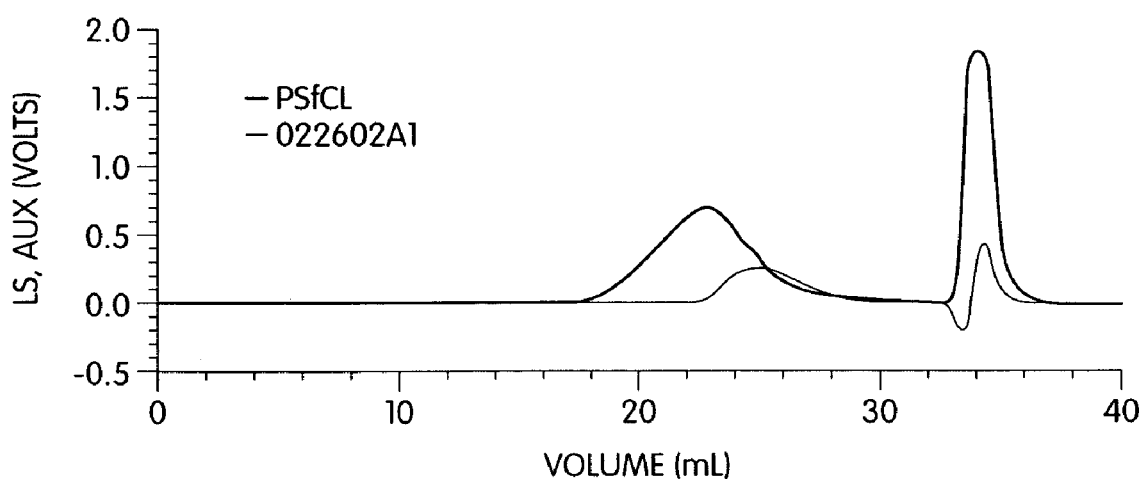
Figure 6C:
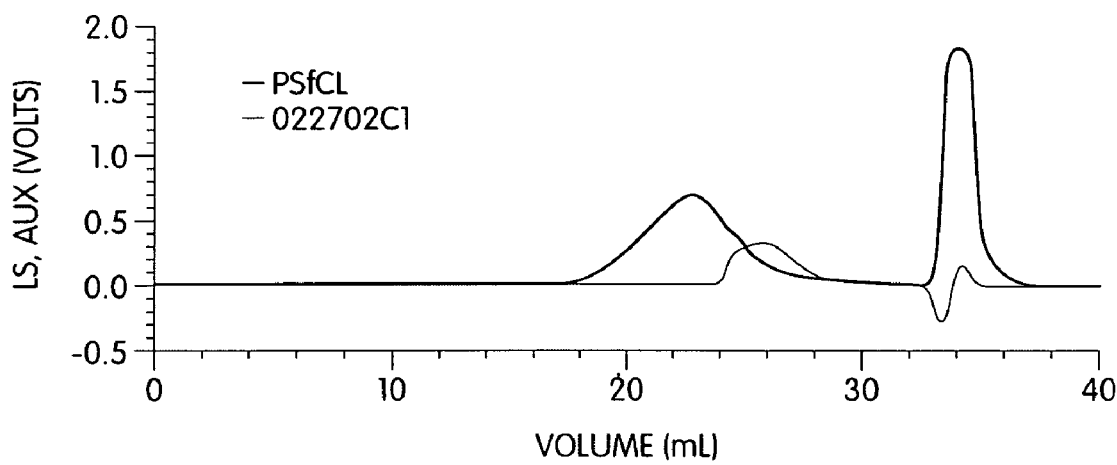
Figure 6D:
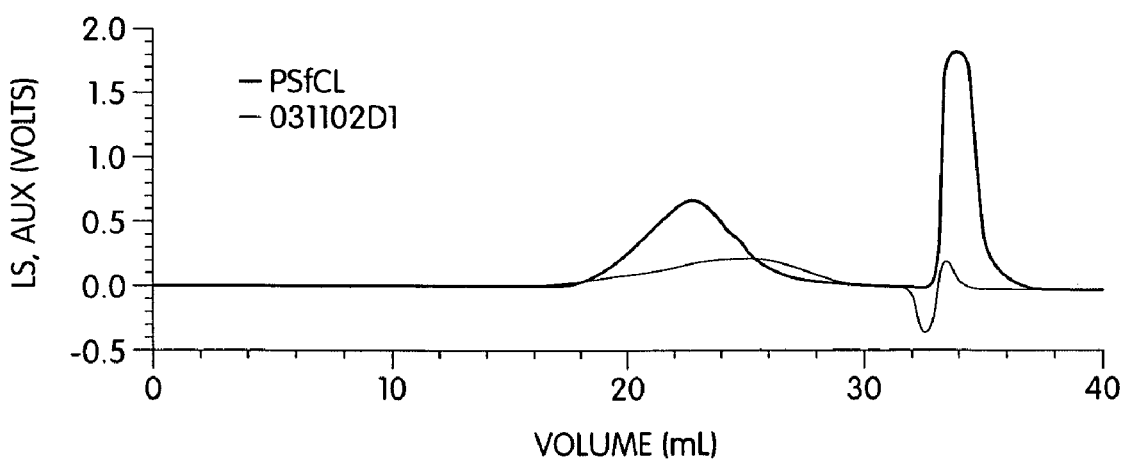

FIG. 6 illustrates GPC traces for an unmodified polysulfone and a chlorinated polysulfone (FIG. 6A), a chlorinated polysulfone and the polysulfone-graft-polyethylene glycol (350 Da) copolymer (abbreviated herein as "PSf-g-PEG$_{350}$") (FIG. 5B), a chlorinated polysulfone and PSf-g-PEG$_{750}$ (FIG. 6C), and a control experiment where polyethylene glycol was omitted (FIG. 6D).

Thus, this example illustrates the synthesis of a grafted polymer of polysulfone and polyethylene glycol.

EXAMPLE 2

This example illustrates the synthesis and analysis of a graft copolymer film.

The grafted copolymer of Example 1 was dissolved in N-dimethyl formamide and spin-coated into thin films on silicon wafers. The spin-coating of polymers to produce films is a known processing technique. As a control, unmodified polysulfone was dissolved in chloroform and also spin-coated into thin films on silicon wafers. The samples were then used in drop contact angle measurements to determine the hydrophilicities of the materials.

Figure 8:
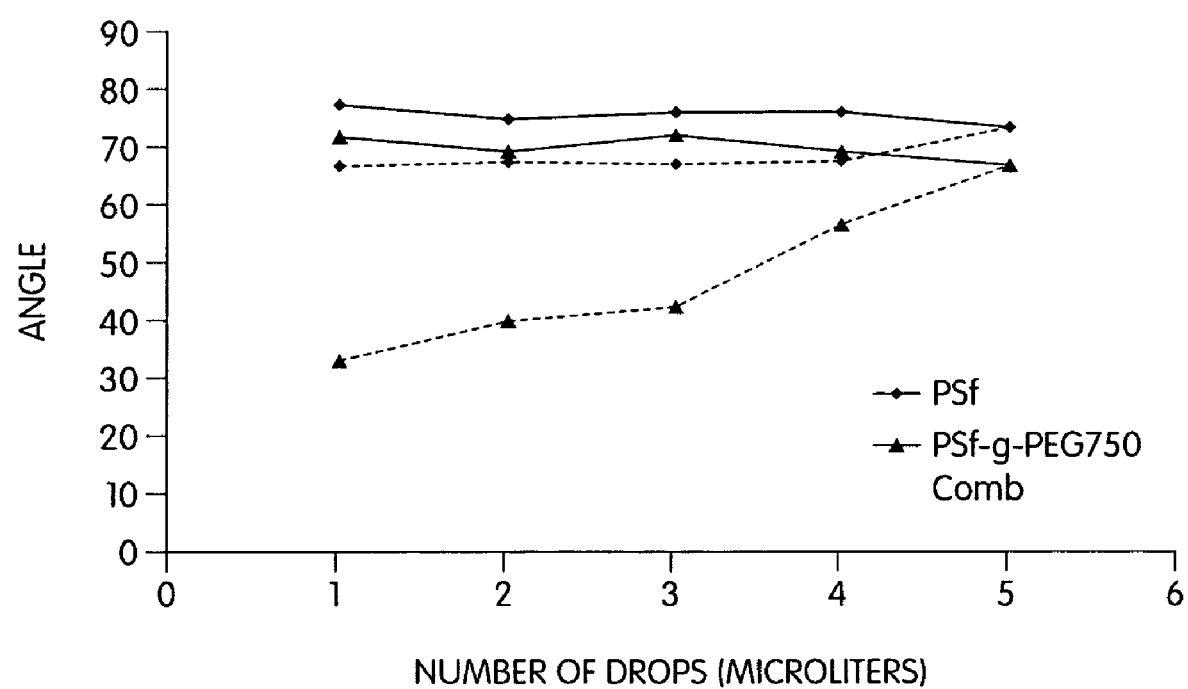
FIG. 8 shows contact angle measurements for various polysulfones.
Figure 12:
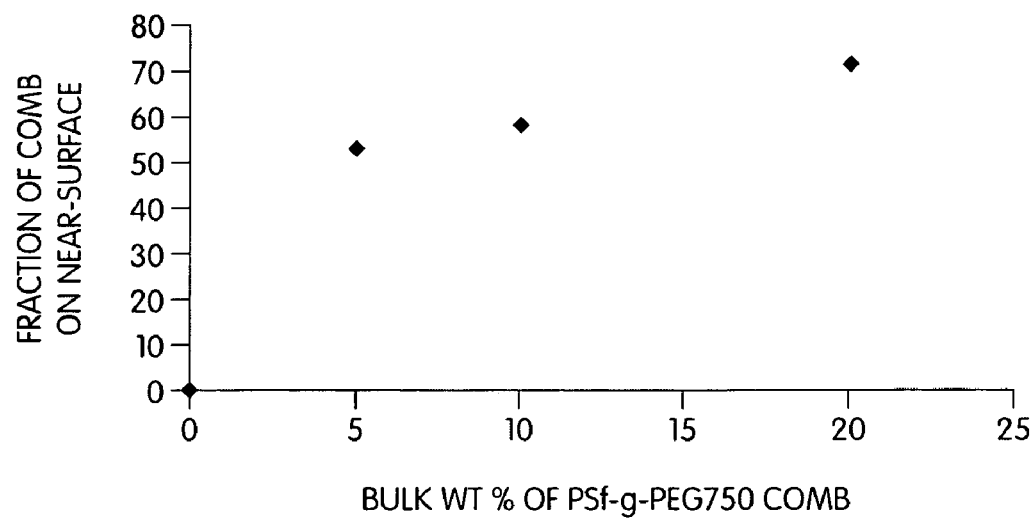
FIG. 12 is a summary plot of the near-surface concentration of various polysulfone membranes.
Figure 21:
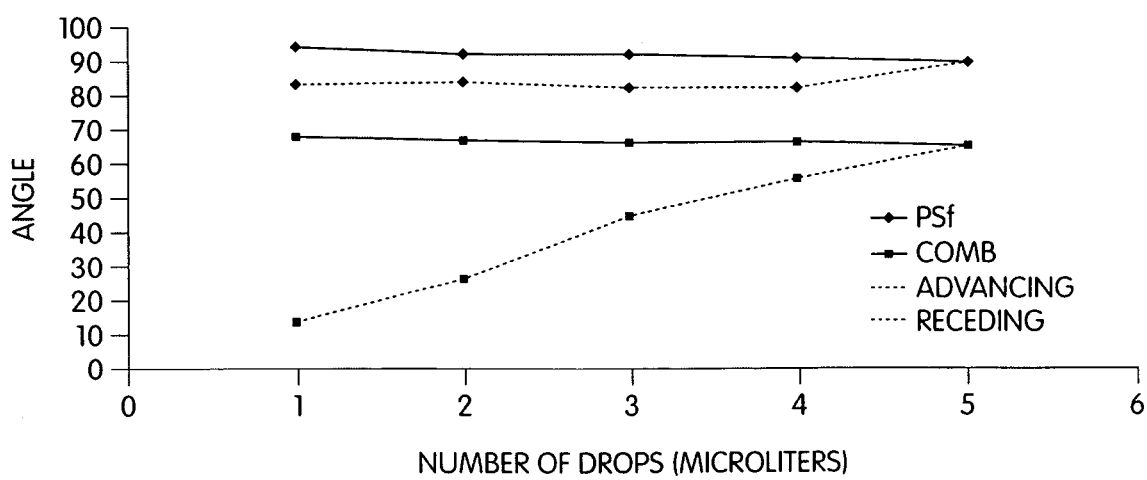
FIG. 21 illustrates contact angle measurements for various polysulfone membranes.

The graph shown in FIG. 21 shows the dynamic change in the contact angle as five continuous advancing angles and four continuous receding angles were measured. The initial advancing and final receding water contact angle of the unmodified polysulfone were 94.5° and 83.4°, respectively, while the graft copolymer exhibited initial advancing and final receding angles of 67.9° and 13.8°, respectively. The decrease in advancing and receding angles of the copolymer thus indicated that the surface of the graft copolymer film was hydrophilic, as compared to the controls. Further contact angle data are shown in FIG. 8 for polysulfone (PSf) and PSf-g-PEG$_{750}$ Comb. Additionally, FIG. 12 shows the near-surface concentration versus the bulk concentration by weight of these films.

Figure 7A:
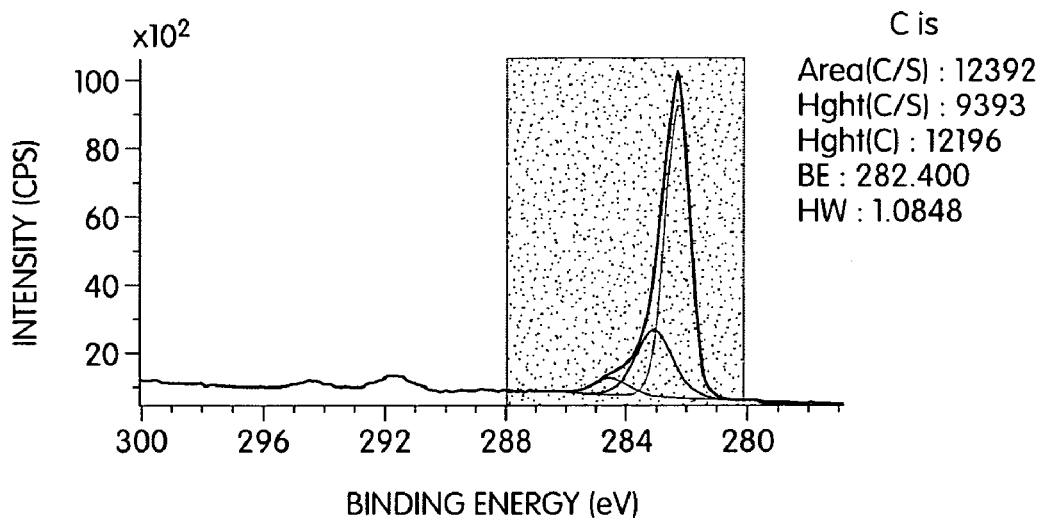
FIGS. 7A-7C illustrate X-ray photoelectron spectroscopy ("XPS") plots of various polysulfones.
Figure 7B:
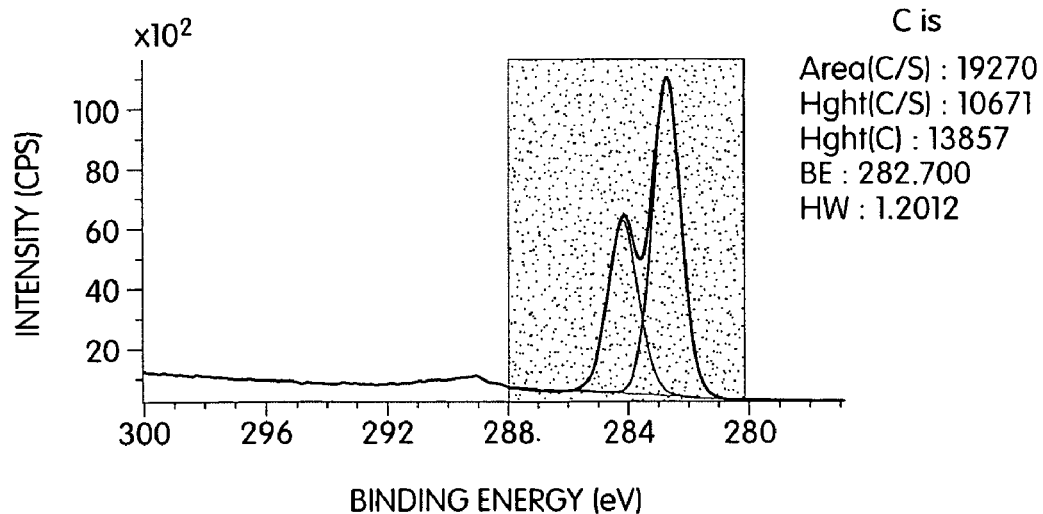
Figure 7C:
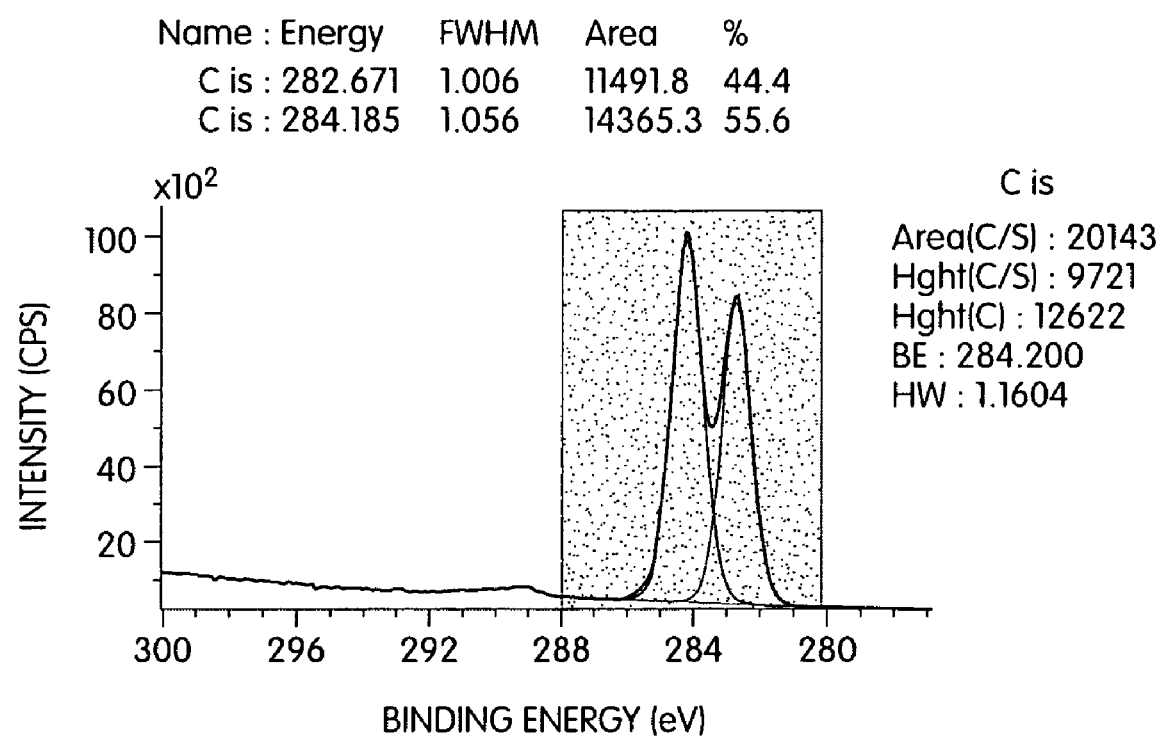

FIG. 7 illustrates XPS plots at the carbon 1s peaks of these films. In these figures, FIG. 7A is an plot of polysulfone, FIG. 7B is a plot of PSf-g-PEG$_{350}$, and FIG. 7C is a plot of PSf-g-PEG$_{750}$.

Figure 9A:
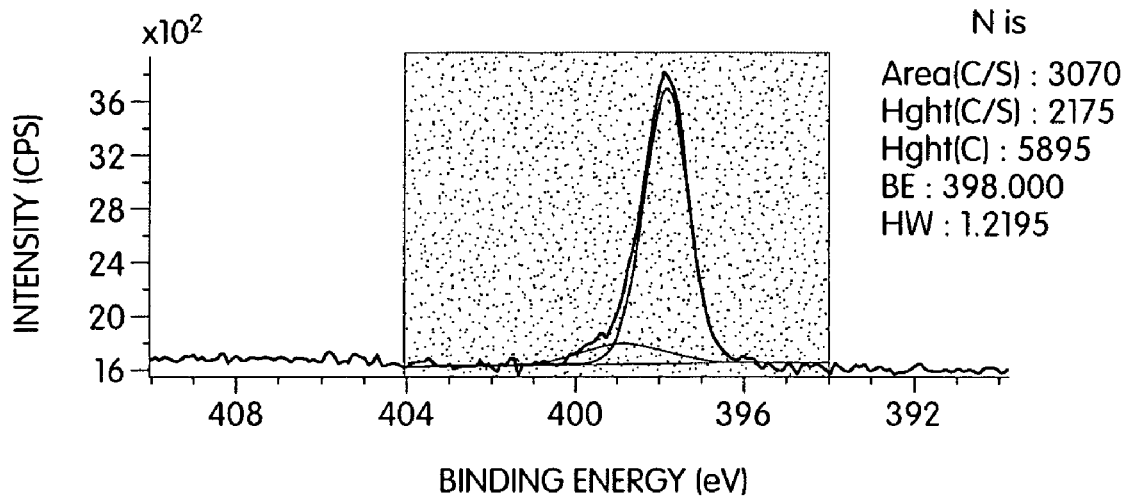
FIGS. 9A-9C illustrate XPS plots describing surface nitrogen content for various polysulfone films.
Figure 9B:
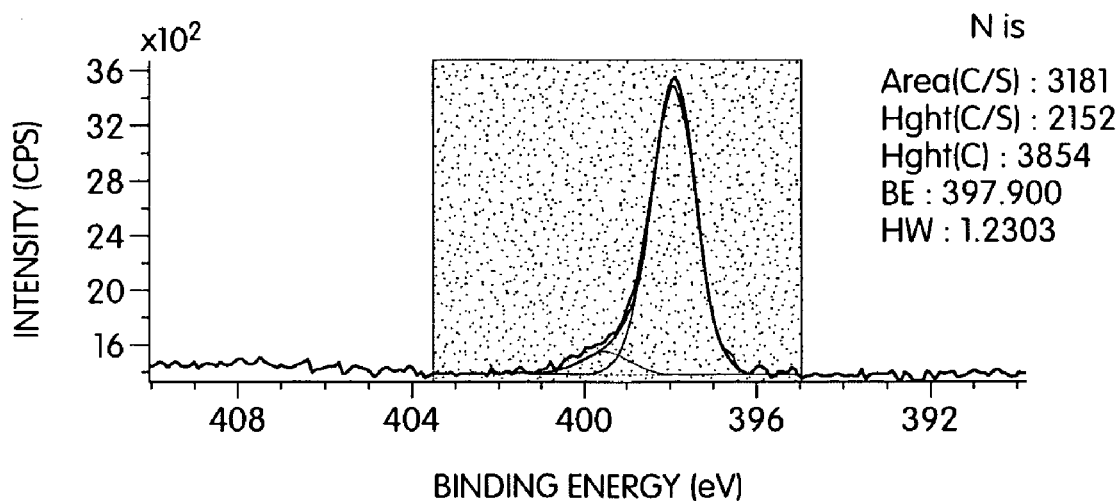
Figure 9C:
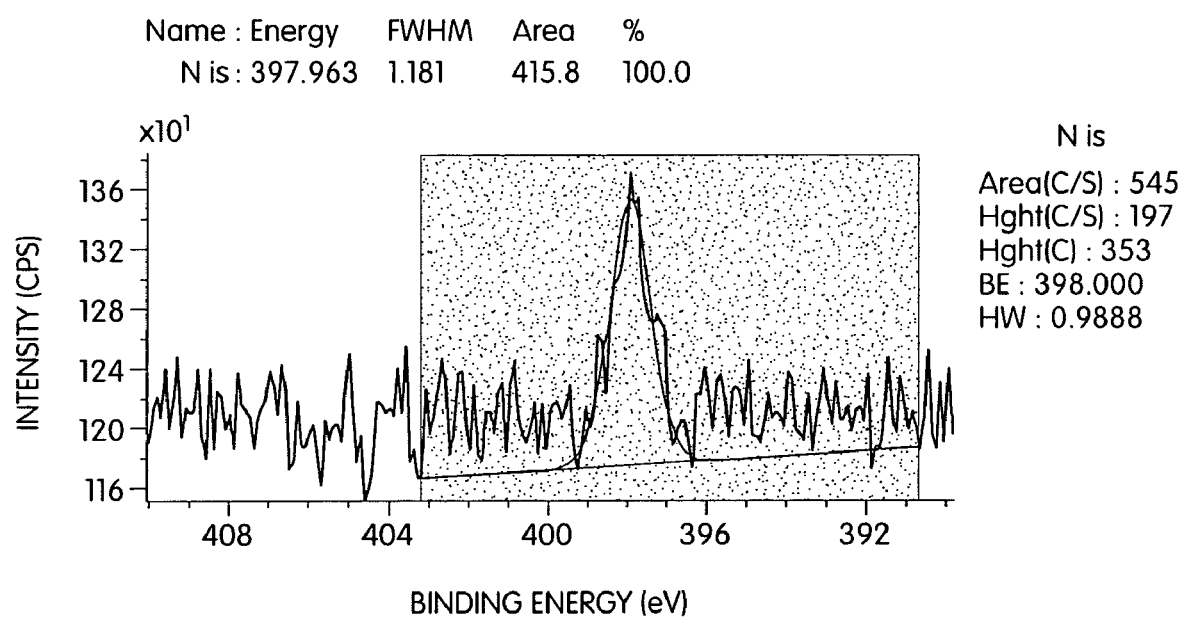
Figure 10:
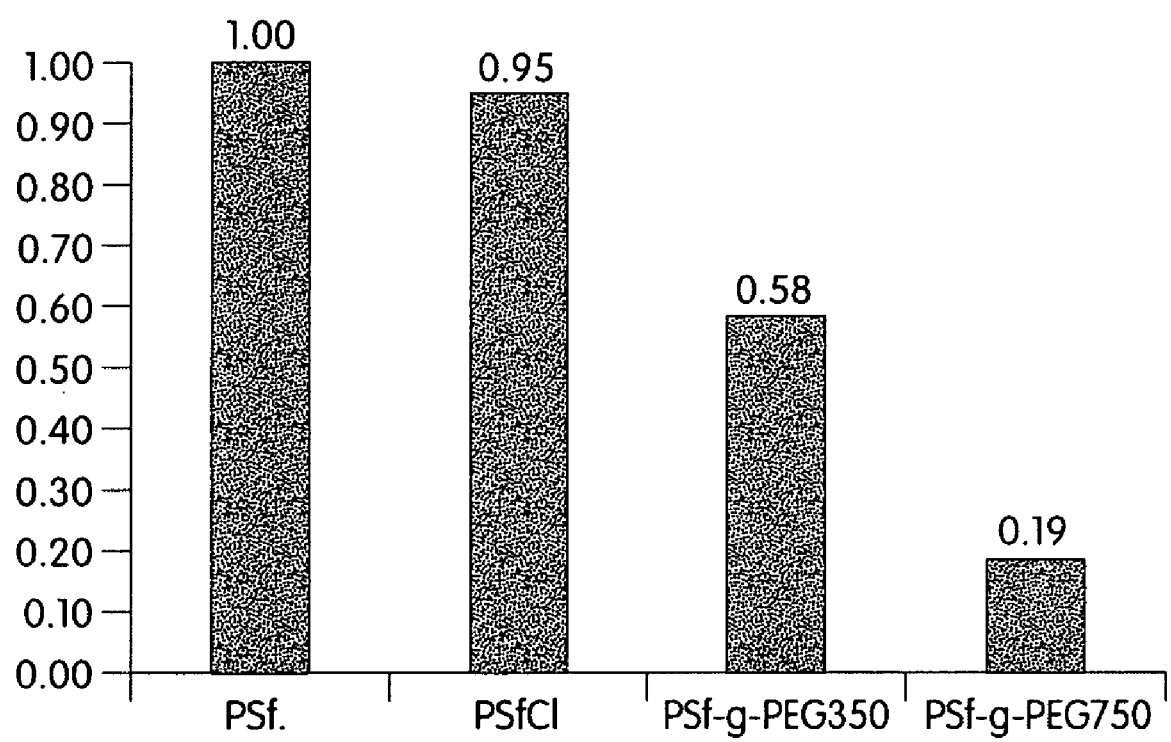
FIG. 10 is a summary plot of the surface nitrogen contents for various polysulfone films.
Figure 11A:
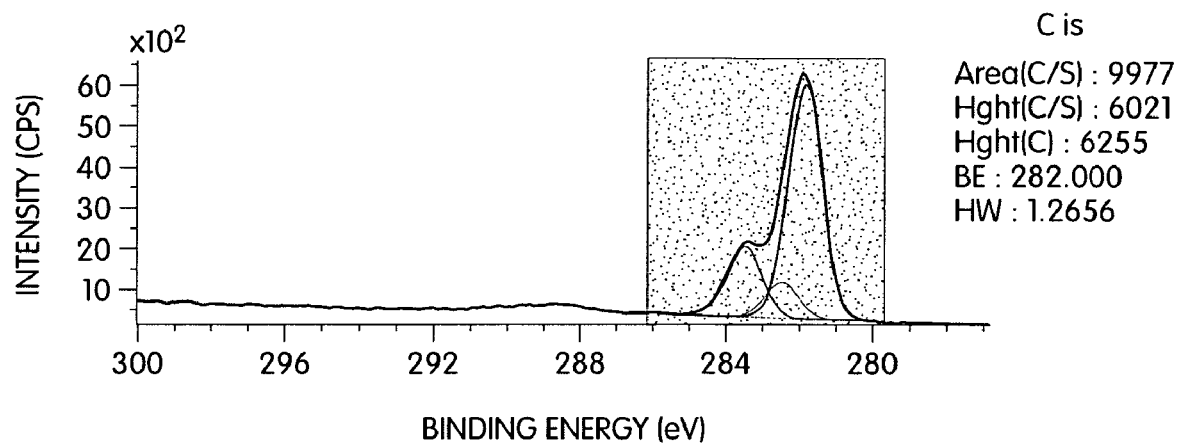
FIG. 11A-11D show XPS plots of various polysulfone membranes.
Figure 11B:
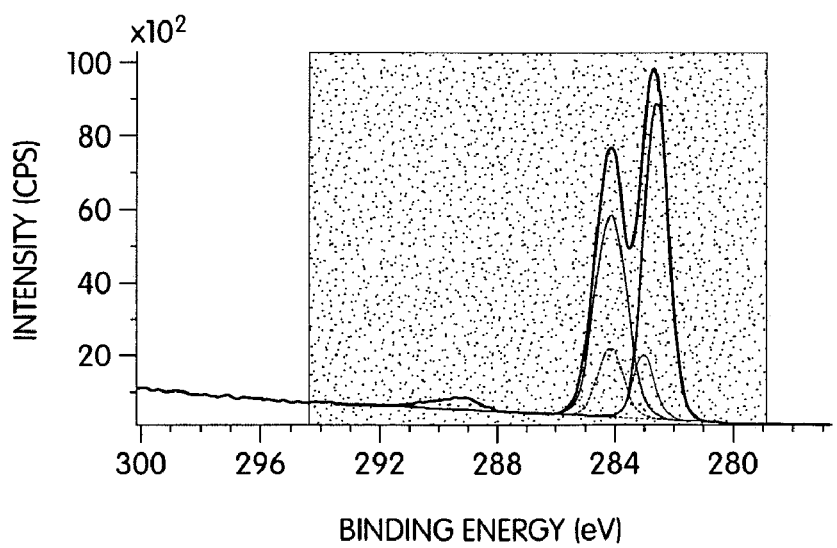
Figure 11C:
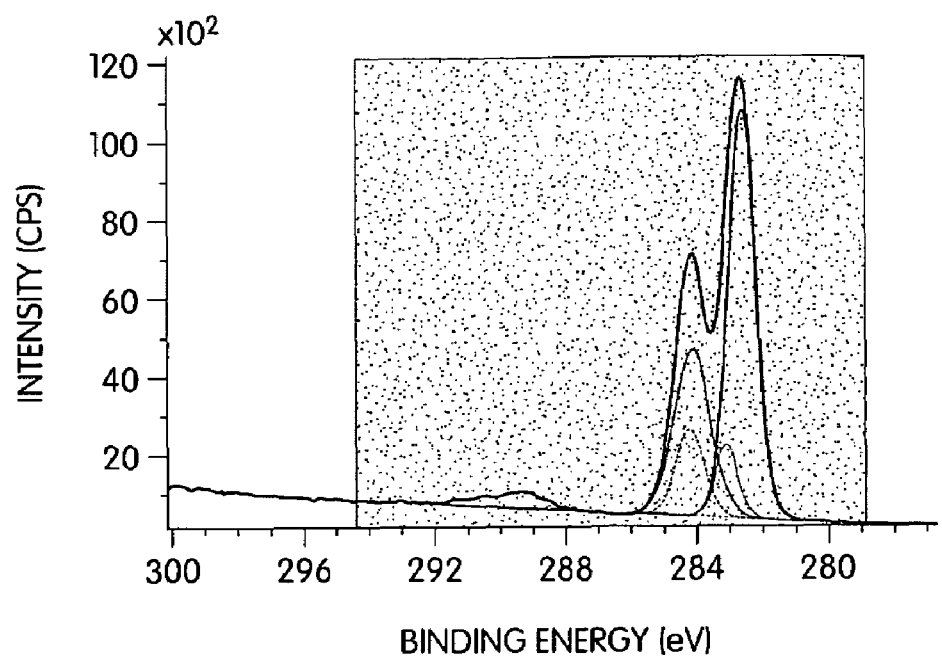
Figure 11D:
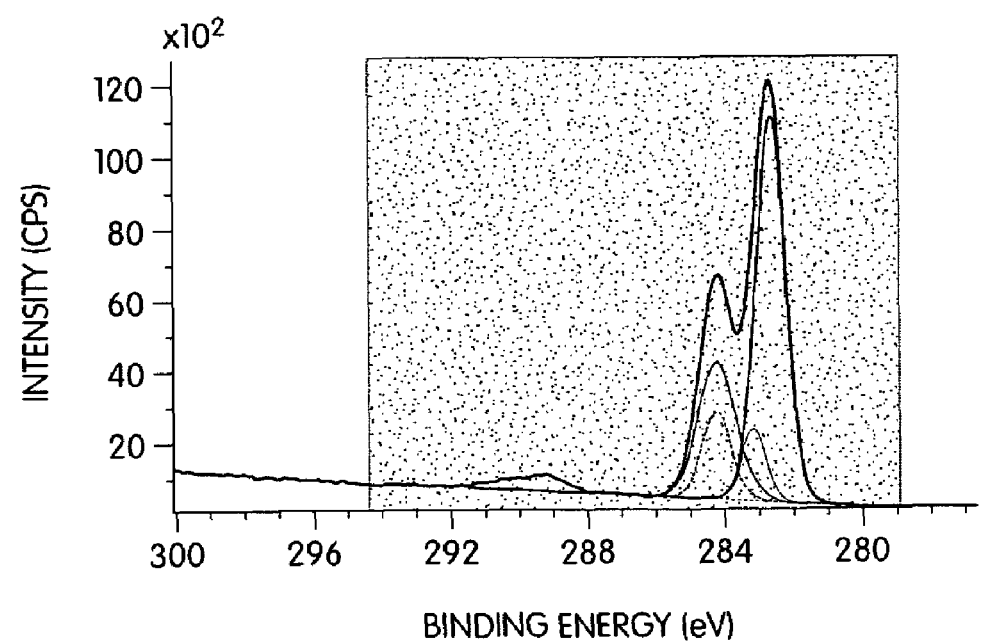

FIG. 9 illustrates surface atomic percent nitrogen content of spin-coated polysulfone films, as detected by XPS at the nitrogen 1 s envelope for polysulfone (FIG. 9A), PSf-g-PEG$_{350}$ (FIG. 9B), and PSf-g-PEG$_{750}$ (FIG. 9C) incubated in 10.0 g/L of bovine serum albumin solution for 24 h at 20° C. Similarly, FIG. 10 shows the surface atomic percent nitrogen content for polysulfone (PSf), chlorinated polysulfone (PSfCl), PSf-g-PEG$_{350}$, and PSf-g-PEG$_{750}$.

Figure 13:
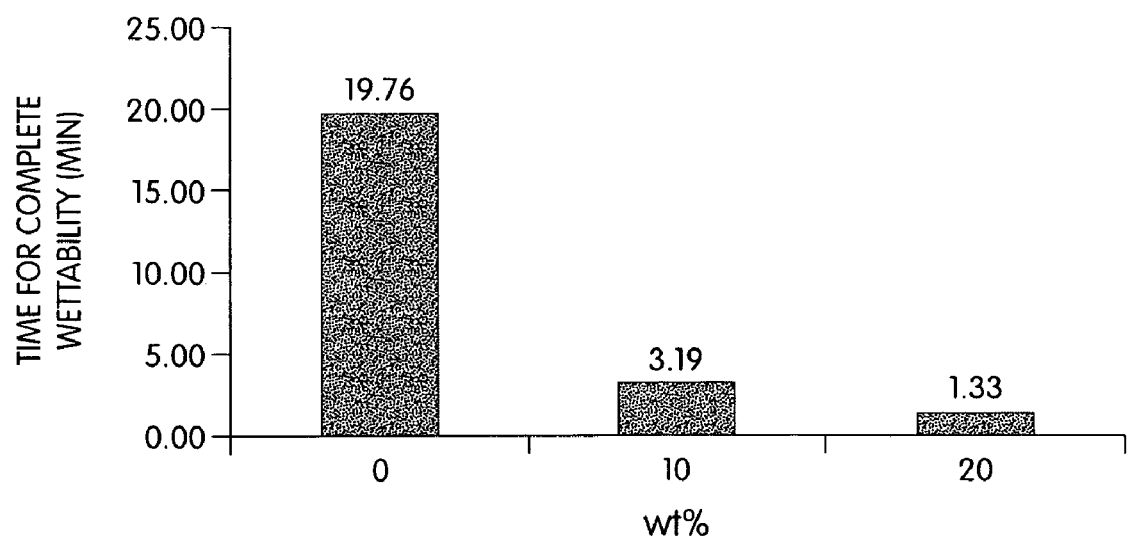
FIG. 13 shows the instantaneous wettability of various polysulfones.
Figure 14A:
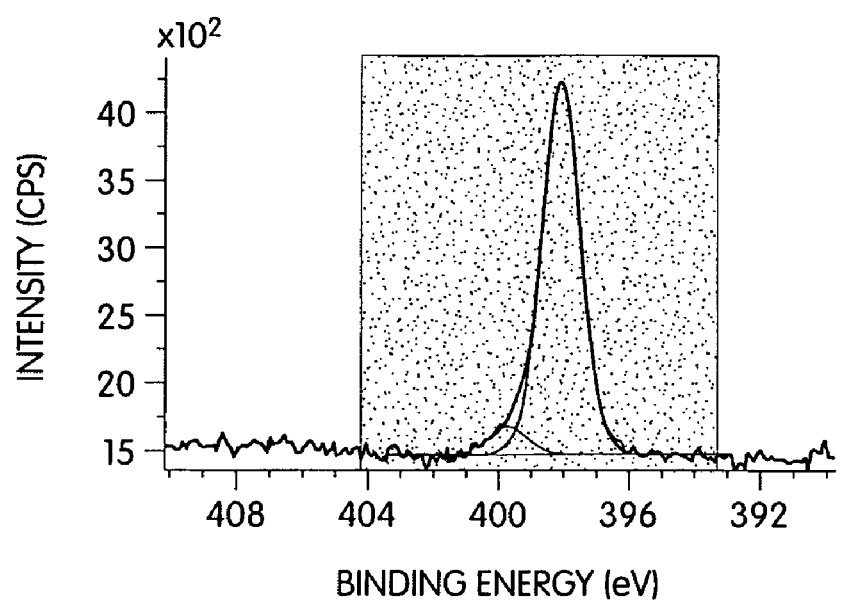
FIG. 14A-14E illustrate XPS plots describing surface atomic percent of nitrogen for various polysulfones.
Figure 14B:
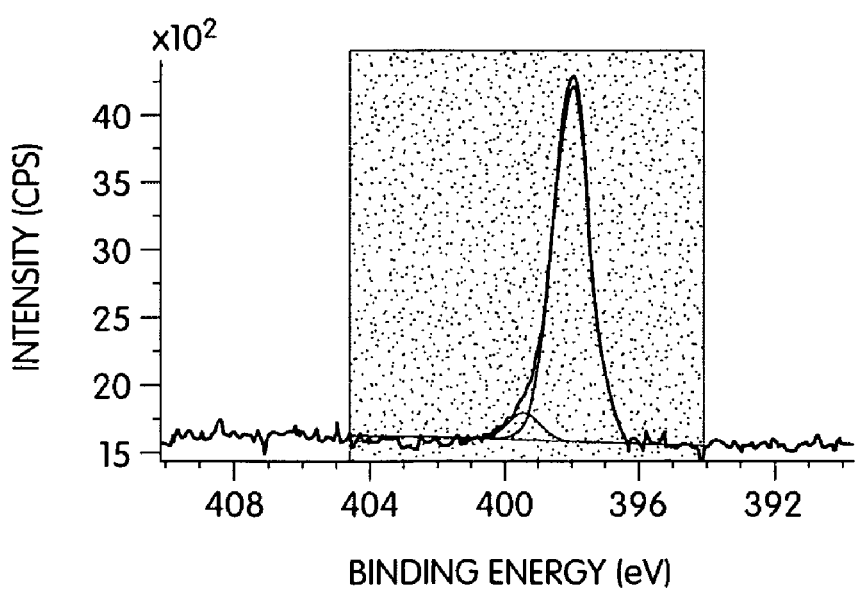
Figure 14C:
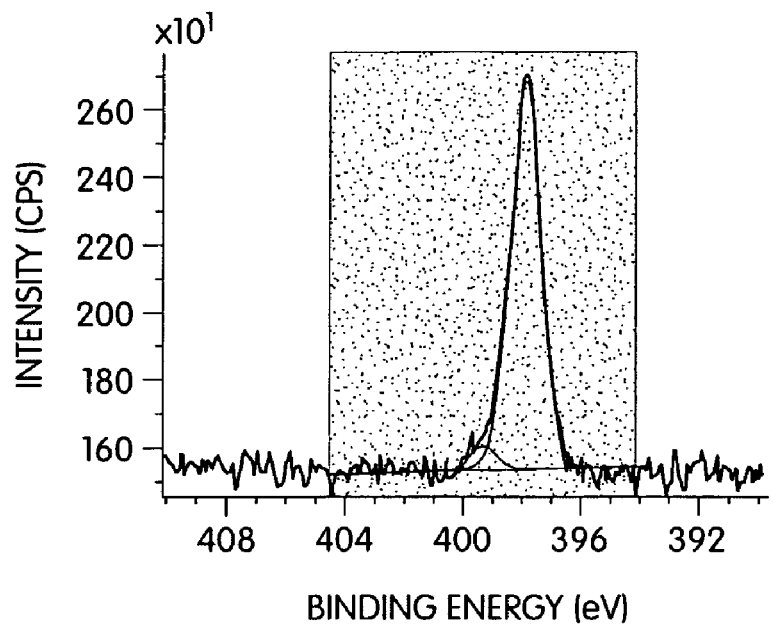
Figure 14D:
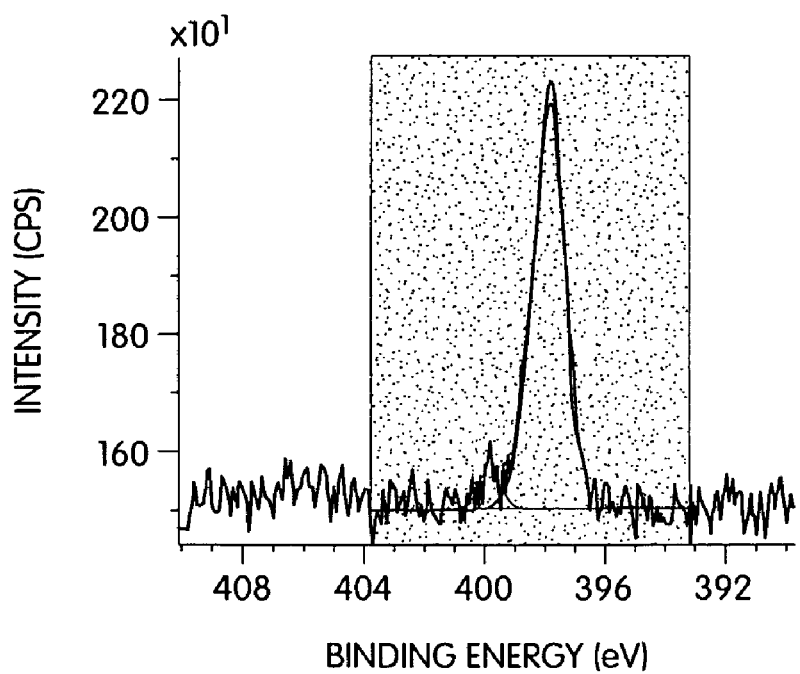
Figure 14E:
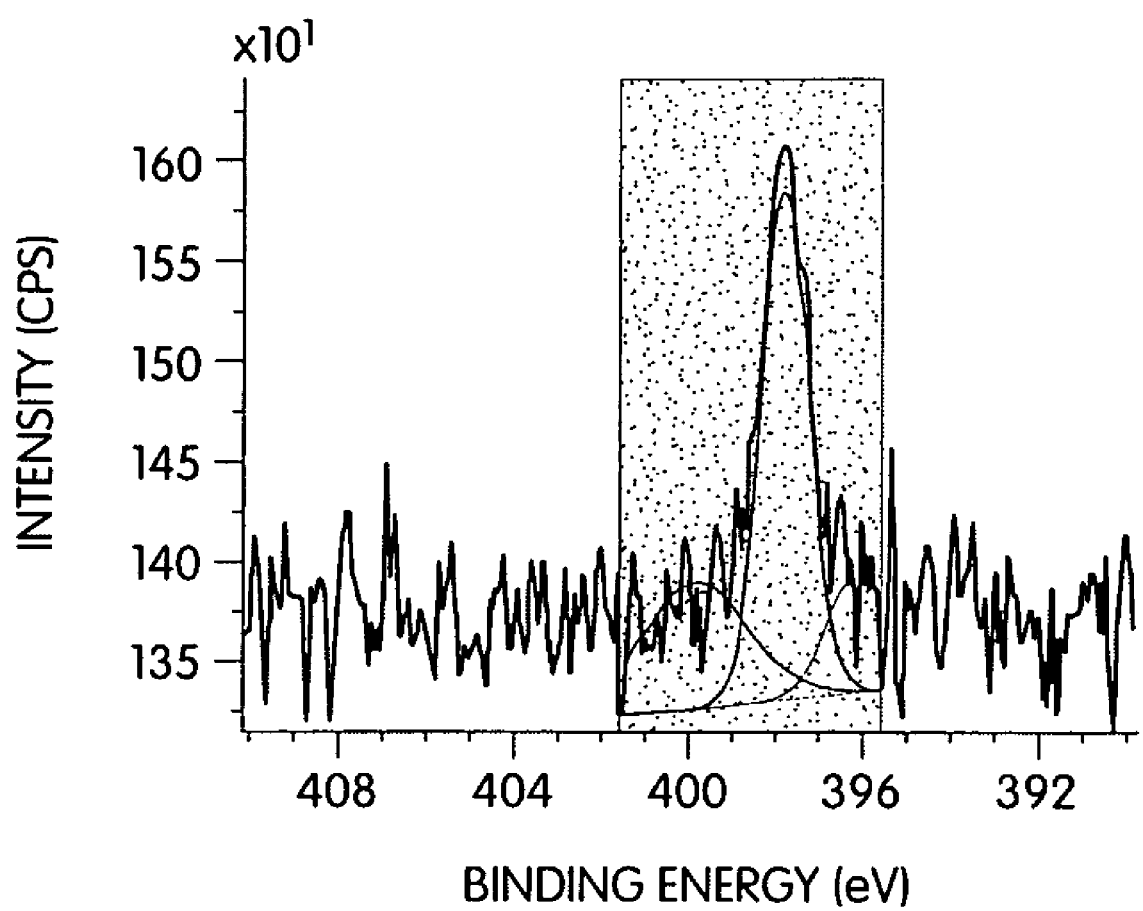
Figure 15:
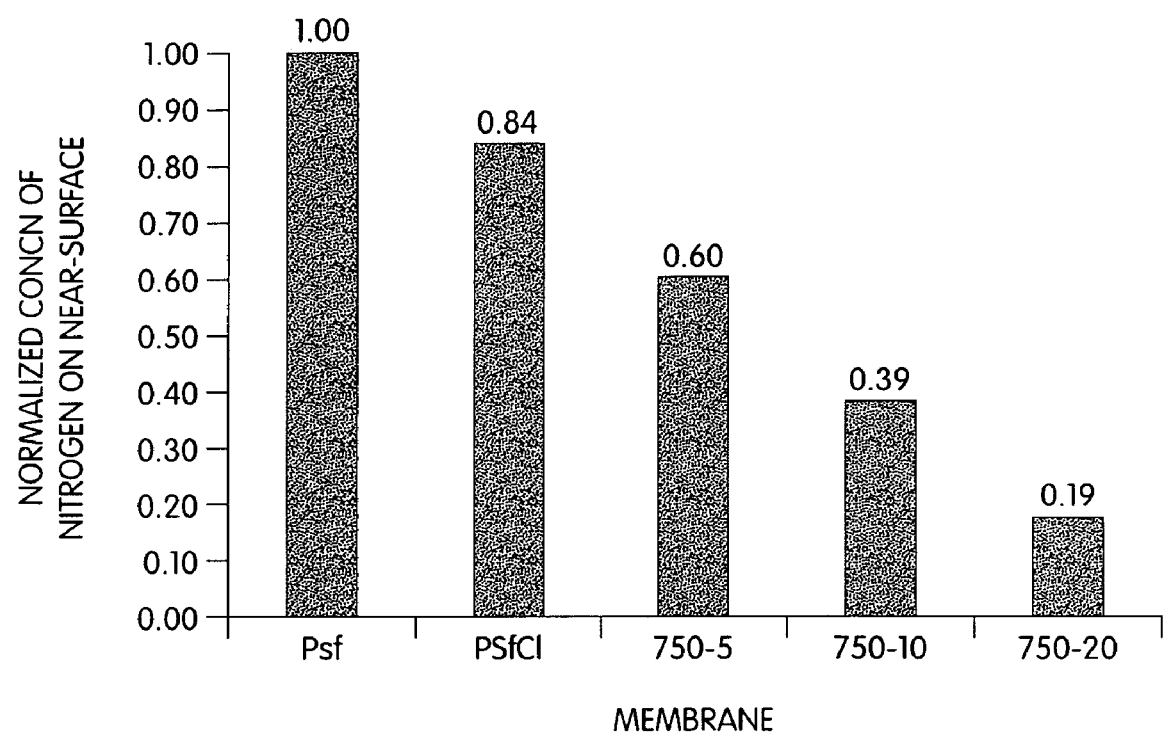
FIG. 15 is a summary plot of the surface nitrogen content of various polysulfone membranes.

FIG. 11 illustrates XPS plots at the carbon Is peaks of a film of polysulfone membrane and PSf-g-PEG$_{750}$. In these figures, the copolymer is present in the amounts of 0 wt % (FIG. 11A), 5 wt % (FIG. 11B), 10 wt % (FIG. 11C), and 20 wt % (FIG. 11D). FIG. 13 shows the instantaneous wettability of these membranes. In these figures, the copolymer is present in the amounts of 0%, 10 wt %, and 20 wt %.

FIG. 14 shows surface atomic percent nitrogen, as detected by XPS, for membranes of polysulfone and PSf-g-PEG$_{750}$. In these figures, the copolymer is present in the amounts of 0 wt % (FIG. 14A), 5 wt % (FIG. 14B), 10 wt % (FIG. 14C), and 20 wt % (FIG. 14D). These membranes were incubated in 10.0 g/L bovine serum albumin solution for 24 h at 20° C. FIG. summarizes these data.

Figure 16A:
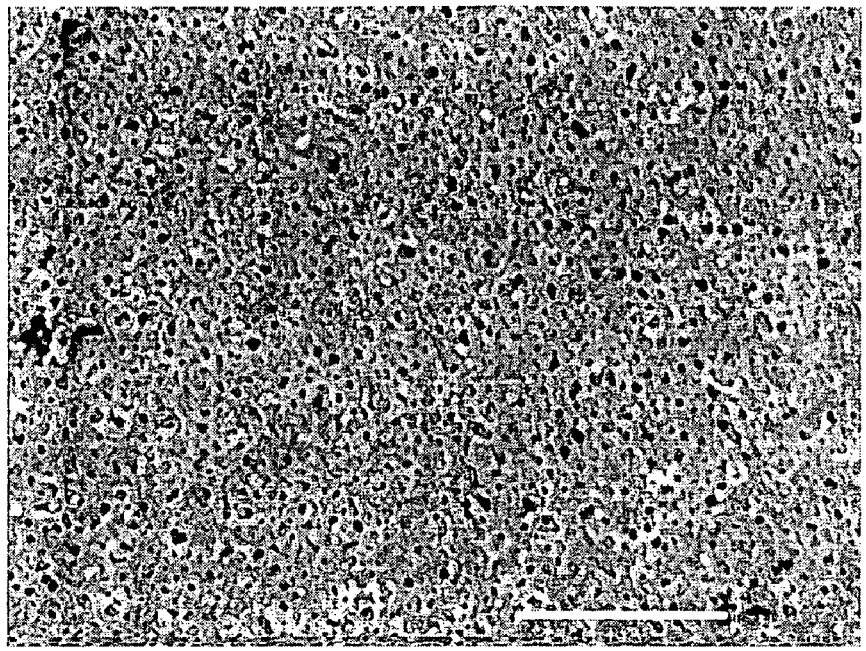
FIGS. 16A-16B show a series of scanning electron microscopy ("SEM") images of various polysulfone membranes.
Figure 16B:
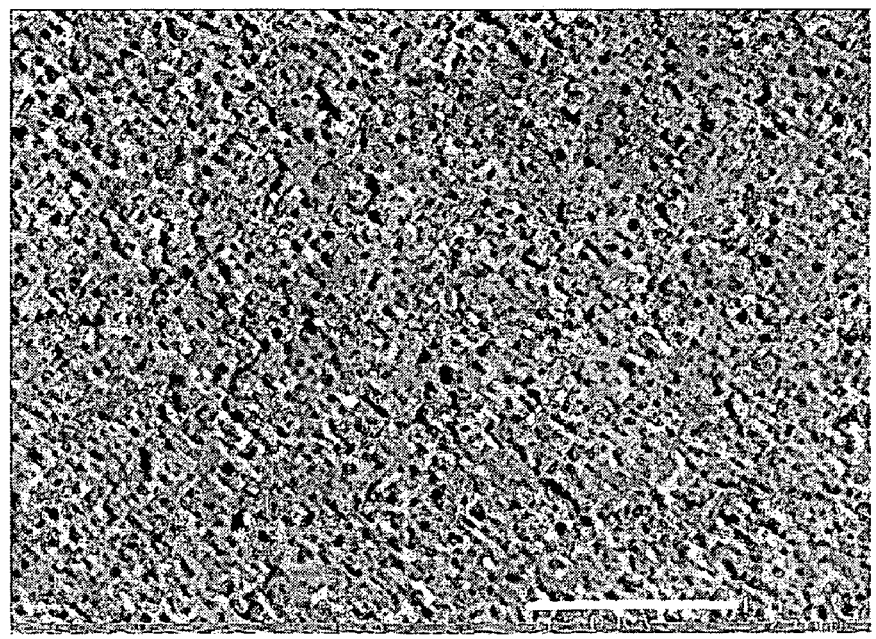
Figure 18A:
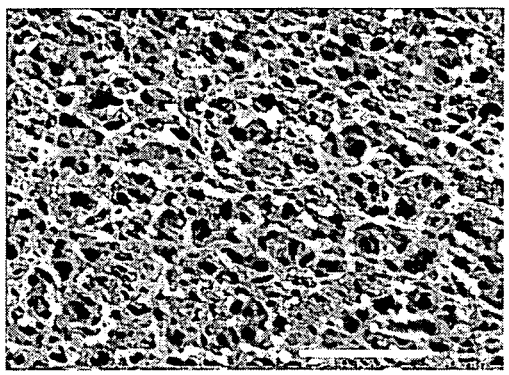
FIGS. 18A-18D show a series of SEM images of various porous membranes formed from copolymers of polysulfone and polyethylene glycol.
Figure 18B:
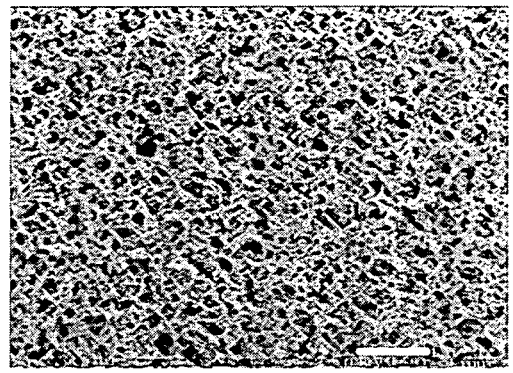
Figure 18C:
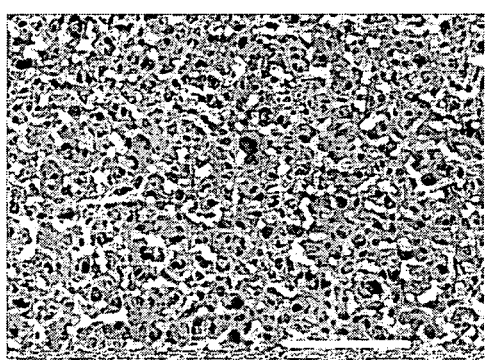
Figure 18D:
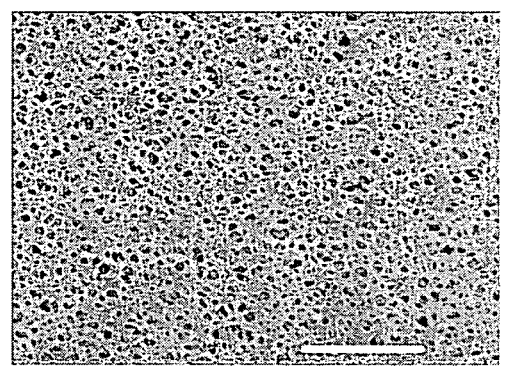

FIG. 16 illustrates SEM photomicrographs of a polysulfone membrane (FIG. 16A) and a polysulfone membrane having 10 wt % of PSf-g-PEG$_{750}$ (FIG. 16B). FIG. 17 shows SEM images of the surface morphology of polysulfone membranes when glycerol is added to the casting solution in the amounts of 2 wt % (FIG. 17A), 4 wt % (FIG. 17B), 6 wt % (FIG. 17C), and 8 wt % (FIG. 17D). Similarly, FIG. 18 shows SEM images of polysulfone membranes having 10 wt % PSf-g-PEG$_{750}$ when glycerol is added to the casting solution in the amounts of 2 wt % (FIG. 18A), 4 wt % (FIG. 18B), 6 wt % (FIG. 18C), and 8 wt % (FIG. 18D).

Figure 19A:
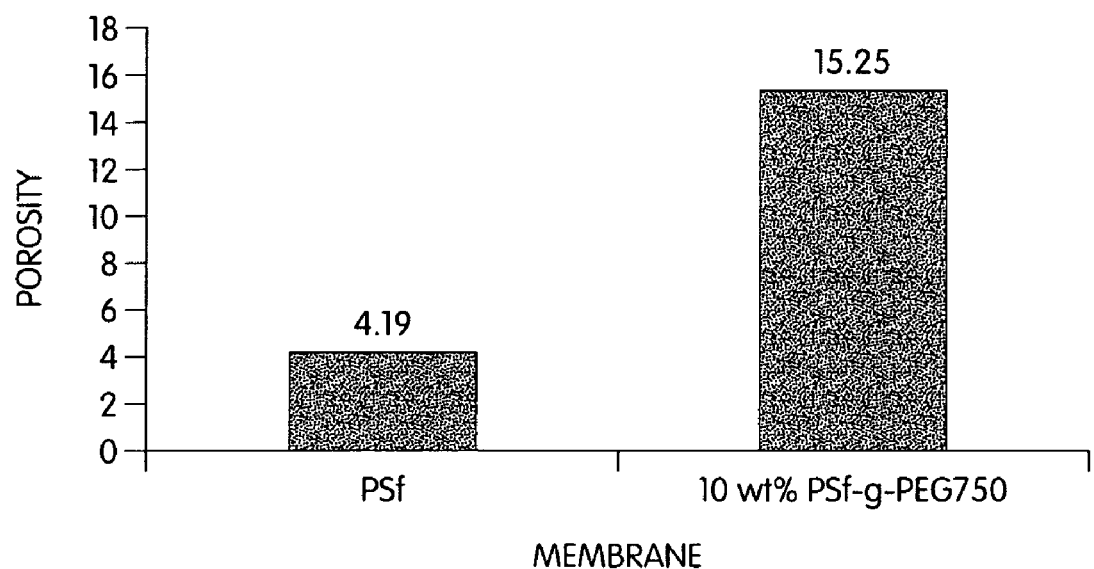
FIGS. 19A-19B illustrate the porosity and the water flux for various polysulfone membranes.
Figure 19B:
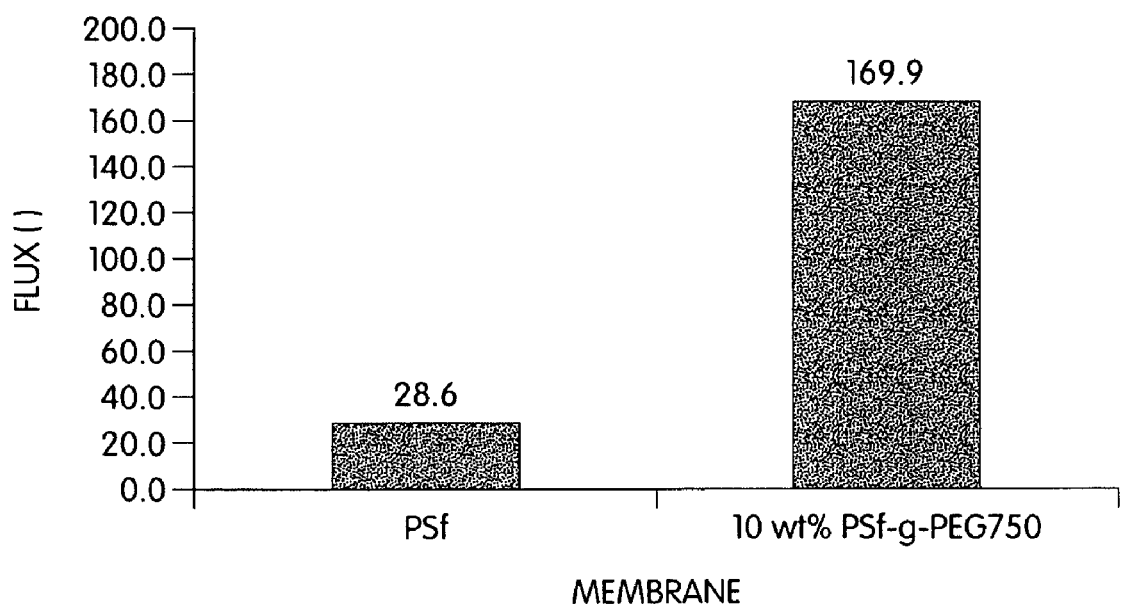
Figure 20:
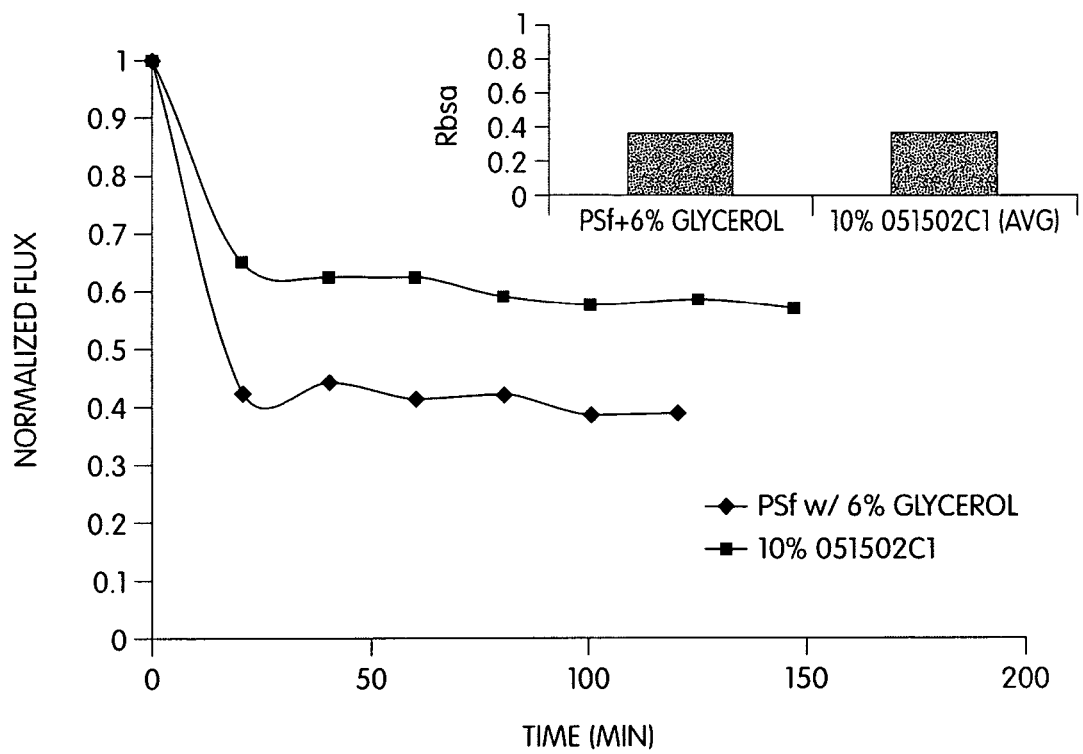
FIG. 20 illustrates fouling within various polysulfone membranes.

FIG. 19 shows the porosity and water flux of a polysulfone membrane (FIG. 19A) and a polysulfone membrane containing 10 wt % PSf-g-PEG$_{750}$ (FIG. 19B). FIG. 20 shows the decrease in flux when the membranes shown in FIGS. 19A-19B are fouled with 0.2 g/L of bovine serum albumin solution.

Thus, this example illustrates the synthesis and analysis of a graft copolymer film.

EXAMPLE 3

The synthesis of a graft copolymer of polysulfone and polyethylene glycol is demonstrated in this example.

Samples of PEG-OH having various molecular weights were dissolved in anhydrous NMP according to the table below:

| Sample | Molecular Weight ($M_n$) | Amount of PEG-OH | NMP (ml) |
|---|---|---|---|
| 1 | 350 (n = 7) | 5.5 ml (0.0017 mol) | 20 |
| 2 | 550 (n = 12) | 9.35 g (0.0017 mol) | 20 |
| 3 | 750 (n = 17) | 12.75 g (0.0017 mol) | 20 |
| 4 | 2000 (n = 44) | 17 g (0.0017 mol) | 25 |
| 5 | 2000 (n = 44) | 34 g (0.0085 mol) | 100 |

To each reaction solution, 3 ml (0.034 mol) of pyridine were added dropwise and stirred for 15 min. Next, 8.67 g (0.034 mol) of chlorinated polysulfone in 35 ml of anhydrous NMP were added dropwise. The reaction was performed at room temperature (about 25° C.) under ambient air for 24 h to 48 h, with the exact reaction time being determined from the desired amount of PEG grafting.

The reaction was halted by precipitating the reaction mixture in a mixture of 1400 ml petroleum ether and 400 ml ethanol. The mixture was then filtered and the solid product was re-dissolved in NMP. After the solid had completely dissolved, the solution was re-precipitated in 1400 ml of petroleum ether and 400 ml of ethanol, then filtered again. The solid product was re-dissolved in NMP. The precipitation and filtration steps were then performed a third time.

The resultant solid product was then dried under vacuum overnight, and stored in a freezer (−20° C.). This procedure thus illustrates the synthesis of a grafted polymer of polysulfone and polyethylene glycol.

While several embodiments of the invention have been described and illustrated herein, those of ordinary skill in the art will readily envision a variety of other means and structures for performing the functions and/or obtaining the results or advantages described herein, and each of such variations or modifications is deemed to be within the scope of the present invention. More generally, those skilled in the art would readily appreciate that all parameters, dimensions, materials, and configurations described herein are meant to be exemplary and that actual parameters, dimensions, materials, and configurations will depend upon specific applications for which the teachings of the present invention are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described. The present invention is directed to each individual feature, system, material and/or method described herein. In addition, any combination of two or more such features, systems, materials and/or methods, if such features, systems, materials and/or methods are not mutually inconsistent, is included within the scope of the present invention.

In the claims (as well as in the specification above), all transitional phrases such as "comprising," "including," "carrying," "having," "containing," "involving," and the like are to be understood to be open-ended, i.e. to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
   reacting a first polymer having at least 4 repeat units and at least one hydroxide group with a base to produce an intermediate; and
   reacting the intermediate with a second polymer comprising a polysulfone and/or a polyethersulfone to produce a graft copolymer.

2. The method of claim 1, wherein the first polymer comprises polyethylene glycol.

3. The method of claim 1, wherein the base comprises an inorganic base.

4. The method of claim 1, wherein the second polymer is halogenated.

5. The method of claim 1, wherein the polysulfone comprises a structure:

$(A-X)_a$, wherein A comprises a benzene ring and X comprises a sulfone linkage, and a is greater than zero.

6. The method of claim 1, wherein the polysulfone comprises a molecular formula:

$(A-X)_a(B-Y)_b(C-Z)_c$, wherein at least one of A, B, and C comprises a benzene ring; X comprises a sulfone linkage; Y comprises an ether linkage; and Z comprises a diyl linkage; and each of a, b, and c is greater than zero.

7. The method of claim 1, further comprising the step of casting the graft copolymer as a film.

8. The method of claim 1, further comprising the step of casting the graft copolymer as a membrane.

9. The method of claim 1, wherein the graft copolymer has a plurality of polymer side chains, wherein a ratio of the weight average molecule weight of the plurality of polymer side chains to the number average molecular weight is less than 2.

10. An article, comprising:
    a non-radicalized polysulfone-polyalkylene glycol graft copolymer.

11. The article of claim 10, wherein the polyalkylene glycol is polyethylene glycol having a molecular weight of at least about 350 g/mol.

12. The article of claim 10, wherein the polysulfone comprises a structure:

$(A-X)_a$, wherein A comprises a benzene ring and X comprises a sulfone linkage, and a is greater than zero.

13. The article of claim 10, wherein the polysulfone comprises a molecular formula:

$(A-X)_a(B-Y)_b(C-Z)_c$, wherein at least one of A, B, and C comprises a benzene ring; X comprises a sulfone linkage; Y comprises an ether linkage; and Z comprises a diyl linkage; and each of a, b, and c is independently greater than zero.

14. The article of claim 10, wherein the article is membrane.

15. The article of claim 14, wherein the membrane has a reduction of protein absorption of at least 50% relative to a polysulfone membrane of equal surface area.

16. The article of claim 10, wherein the article is a film.

17. The article of claim 16, wherein the film has a reduction of protein absorption of at least 80% relative to a polysulfone film of equal surface area.

18. The article of claim 16, wherein the film has an advancing contact angle of less than about 70°.

19. The article of claim 16, wherein the film exhibits resistance to cell attachment.

* * * * *